United States Patent
Biyani et al.

(10) Patent No.: US 10,924,466 B2
(45) Date of Patent: Feb. 16, 2021

(54) SYSTEM AND METHOD FOR IOT SECURITY

(71) Applicant: SmartAxiom, Inc., Fullerton, CA (US)

(72) Inventors: Amit Biyani, Fullerton, CA (US); Gunjan Karun, Indore (IN)

(73) Assignee: SmartAxiom, Inc., Fullerton, CA (US)

( * ) Notice: Subject to any disclaimer, the term of this patent is extended or adjusted under 35 U.S.C. 154(b) by 279 days.

(21) Appl. No.: 16/048,140

(22) Filed: Jul. 27, 2018

(65) Prior Publication Data
US 2019/0036906 A1   Jan. 31, 2019

Related U.S. Application Data

(60) Provisional application No. 62/538,511, filed on Jul. 28, 2017.

(51) Int. Cl.
*H04L 29/06* (2006.01)
*H04L 9/32* (2006.01)
(Continued)

(52) U.S. Cl.
CPC .......... *H04L 63/0807* (2013.01); *G06F 21/64* (2013.01); *H04L 9/0637* (2013.01);
(Continued)

(58) Field of Classification Search
CPC ... H04L 9/0637; H04L 9/3236; H04L 9/3247; H04L 9/3297; H04L 63/0807;
(Continued)

(56) References Cited

U.S. PATENT DOCUMENTS 9,608,829 B2 *  3/2017  Spanos ................. H04L 9/0894
10,673,617 B1 *  6/2020  Antoniou ............ G06F 13/4282
(Continued)

OTHER PUBLICATIONS

Schwartz et al., "System and Method for Unique Wire Payment Tracking and Management", Jul. 24, 2017, Provisional Applicaiton, pp. 60 (Year: 2017).*
(Continued)

*Primary Examiner* — Kari L Schmidt
(74) *Attorney, Agent, or Firm* — Mahesh Law Group PC; Kumar Maheshwari

(57) ABSTRACT

The present disclosure relates to a method and system for enabling IOT security using a decentralized IOT security platform that leverages the advanced communication and blockchain security thread model to protect IOT eco-systems. The platform uses a multi-chain data schema including a device chain and an event chain. The multi-chain data schema uses a time-envelope mechanism to generate an event to connect different device chains and enforce a set of security rules through smart contracts. The method comprising receiving an encrypted block from IOT device with event data and verifying the device signature and identity based on certain rules within the device chain. Further, the method comprising determining access to event chain using previous token, current token and timestamp of the encrypted block and updating the event chain upon access determination. The event chain protects data integrity and confidentiality against malicious packets, unauthorized devices, weak encryption and man-in-the-middle attacks.

20 Claims, 18 Drawing Sheets

(51) Int. Cl.
*G06F 21/64* (2013.01)
*H04L 29/08* (2006.01)
*H04L 9/06* (2006.01)

(52) U.S. Cl.
CPC .......... *H04L 9/3236* (2013.01); *H04L 9/3247* (2013.01); *H04L 9/3297* (2013.01); *H04L 63/08* (2013.01); *H04L 63/0884* (2013.01); *H04L 63/102* (2013.01); *H04L 63/12* (2013.01); *H04L 63/20* (2013.01); *H04L 67/12* (2013.01); *H04L 2209/38* (2013.01)

(58) Field of Classification Search
CPC ... H04L 63/08; H04L 63/0884; H04L 63/102; H04L 63/12; H04L 63/20; H04L 2209/38; G06F 21/64
See application file for complete search history.

(56) References Cited

U.S. PATENT DOCUMENTS

| | | | |
|---|---|---|---|
| 2015/0067154 A1* | 3/2015 | Ly | H04L 67/125 709/224 |
| 2016/0259937 A1* | 9/2016 | Ford | G06F 21/577 |
| 2017/0011460 A1* | 1/2017 | Molinari | G06F 21/645 |
| 2017/0019873 A1* | 1/2017 | Britt | G06Q 30/0261 |
| 2017/0046694 A1* | 2/2017 | Chow | G06Q 10/103 |
| 2017/0046792 A1* | 2/2017 | Haldenby | G06F 21/645 |
| 2017/0103468 A1* | 4/2017 | Orsini | G07F 15/003 |
| 2017/0243193 A1* | 8/2017 | Manian | G06Q 20/065 |
| 2017/0302663 A1* | 10/2017 | Nainar | H04L 63/123 |
| 2017/0364908 A1* | 12/2017 | Smith | G06Q 20/023 |
| 2018/0007131 A1* | 1/2018 | Cohn | H04L 67/1068 |
| 2018/0053160 A1* | 2/2018 | Schwartz | G06Q 20/4014 |
| 2018/0117447 A1* | 5/2018 | Tran | A42B 3/046 |
| 2018/0268386 A1* | 9/2018 | Wack | H04L 9/085 |
| 2018/0328612 A1* | 11/2018 | Sinha | F24F 11/62 |
| 2019/0013948 A1* | 1/2019 | Mercuri | G06F 9/451 |
| 2019/0097819 A1* | 3/2019 | Woodcock, IV | H04L 9/3297 |
| 2019/0180276 A1* | 6/2019 | Lee | H04L 63/10 |
| 2019/0182257 A1* | 6/2019 | Lee | G06Q 10/06315 |
| 2019/0253434 A1* | 8/2019 | Biyani | H04L 63/065 |
| 2019/0386969 A1* | 12/2019 | Verzun | H04L 63/102 |
| 2019/0394050 A1* | 12/2019 | Goeringer | H04L 9/3226 |
| 2020/0126050 A1* | 4/2020 | Savolainen | H04M 15/00 |
| 2020/0213306 A1* | 7/2020 | Thomsen | H04L 9/0891 |

OTHER PUBLICATIONS

Mercuri et al., "Smartlet Manager", Jul. 7, 2017, Provisional Application, pp. 38 (Year: 2017).*

D. E. Kouicem et al., "Distributed Fine-Grained Secure Control of Smart Actuators in Internet of Things," IEEE International Symposium on Parallel and Distributed Processing with Applications and 2017 IEEE International Conference on Ubiquitous Computing and Communications,, 2017, pp. 653-660. (Year: 2017).*

Wang, Hui, Yuanyuan Cen, and Xuefeng Li. "Blockchain router: a cross-chain communication protocol." Proceedings of the 6th international conference on informatics, environment, energy and applications. 2017. pp. 94-97. (Year: 2017).*

Walker, Michael A., et al. "Platibart: a platform for transactive iot blockchain applications with repeatable testing." Proceedings of the 4th Workshop on Middleware and Applications for the Internet of Things. 2017. pp. 17-22. (Year: 2017).*

Banafa, Ahmed. "IoT and blockchain convergence: benefits and challenges." IEEE Internet of Things (2017). (Year: 2017).*

* cited by examiner

SYSTEM AND METHOD FOR IOT SECURITY

CROSS REFERENCES TO RELATED APPLICATIONS

The application claims benefit of U.S. Provisional Patent Application Ser. No. 62/538,511, entitled as "System and Methods for IOT Security", filed on Jul. 28, 2017, the disclosure of which is incorporated by reference in its entirety.

TECHNICAL FIELD OF THE DISCLOSURE

The present disclosure generally relates to Internet of Things (IOT) security, and more particularly, but not exclusively to a method and a system for enabling IOT security using Blockchain.

BACKGROUND

Currently, Internet of Things (IoT) ecosystems rely on centralized, brokered communication models, otherwise known as the centralized paradigm or client-server architecture. All devices are identified, authenticated and connected through cloud servers which have large processing and storage capacities. Information between devices transfers through the Internet, even if they happen to be a few distance apart. While the centralized model has connected generic computing devices for decades, and will continue to support small-scale IoT networks, however the above framework has challenges in addressing the growing needs of large IoT ecosystems that will be developed in the future.

Existing IoT solutions are expensive because of high infrastructure and maintenance costs associated with centralized clouds, large server farms and networking equipment. The sheer amount of communications needed to be processed when IoT devices grow to the tens of billions will increase costs substantially. Even if the economical and engineering challenges are overcome, cloud servers will remain a bottleneck and a point of failure that can disrupt the entire network. This is especially important as more critical tasks increase exponentially.

Moreover, the diversity of ownership between devices and their supporting cloud infrastructure makes machine-to-machine (M2M) communications difficult. There is no platform that connects all devices and guarantees that cloud services offered by different manufacturers are interoperable and compatible.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of enabling secure access to at least one Internet of Things (IOT) device. The method comprising steps of receiving at least one encrypted block generated by at least one IOT device on the private network, wherein the at least one encrypted block comprises a unique device identification (ID), previous token, current token, time stamp, and event data. The method further comprising parsing the at least one encrypted block received to determine the unique device ID of the at least one IOT device and verifying the authenticity of the at least one IOT device using a device chain to validate the device signature and identity of the at least one IOT device. upon successful verification of the at least one IOT device, access to an event chain is determined using the previous token and the current token of the at least one encrypted block. Furthermore, the method comprises updating the event chain with the received event data upon verifying the received event data using time stamp, the previous token and the current token of the at least one encrypted block.

Further, the present disclosure relates to an IOT security system for enabling secure access to at least one Internet of Things (IOT) device on a private network. The system comprises at least one IOT gateway device capable of communicating with at least one IOT device. The IOT gateway device comprises a processor, and a distributed ledger database communicatively coupled with the processor. The IOT gateway device further comprises a memory coupled to the processor, wherein the memory stores processor instructions, which, on execution, causes the processor to receive at least one encrypted block generated by at least one IOT device on the private network. The encrypted block comprises a unique device identification (ID), previous token, current token, time stamp, and event data. The processor is further configured to parse the at least one encrypted block received to determine the unique device ID of the at least one IOT device and verify the authenticity of the at least one IOT device using a device chain to validate the device signature and identity of the at least one IOT device. Upon successful verification of the at least one IOT device, the processor determines access to an event chain using the previous token and the current token of the at least one encrypted block. Further, the processor updates the event chain with the received event data upon verifying the received event data using time stamp, the previous token and the current token of the at least one encrypted block.

Furthermore, the present disclosure relates to a non-transitory computer readable medium including instructions stored thereon that when processed by at least one processor cause the IOT security system to perform act of receiving at least one encrypted block generated by at least one IOT device on the private network. The encrypted block comprises a unique device identification (ID), previous token, current token, time stamp, and event data. The instructions further cause the processor to parse the at least one encrypted block received to determine the unique device ID of the at least one IOT device. Furthermore, the instructions cause the processor to verify the authenticity of the at least one IOT device using a device chain to validate the device signature and identity of the at least one IOT device. Upon successful verification of the at least one IOT device, the instructions cause the processor to determine access to an event chain using the previous token and the current token of the at least one encrypted block and update the event chain with the received event data. The instructions cause the processor to update the event chain upon verifying the received event data using time stamp, the previous token and the current token of the at least one encrypted block.

Other embodiment may include a method or system of enabling secure access to at least one Internet of Things (IOT) device on a network by an IOT security system, comprising receiving, by a processor of an IOT gateway device of the IOT security system, at least one encrypted block generated by at least one IOT device on the network, wherein the at least one encrypted block comprises a unique device identification (ID), previous device token, current device token, time stamp, and event data and parsing, by the processor, the at least one encrypted block received to determine the unique device ID of the at least one IOT device. The embodiment may further include verifying, by the processor, the authenticity of the at least one IOT device using a device chain to validate the device signature and identity of the at least one IOT device. The embodiment may further include determining, by the processor, access to an event chain using the previous event token and the current event token of the at least one encrypted block, upon successful verification of the at least one IOT device. The embodiment may further include updating, by the processor, the event chain with the received event data upon verifying the received event data using the time stamp, the previous device token and the current device token of the at least one encrypted block.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
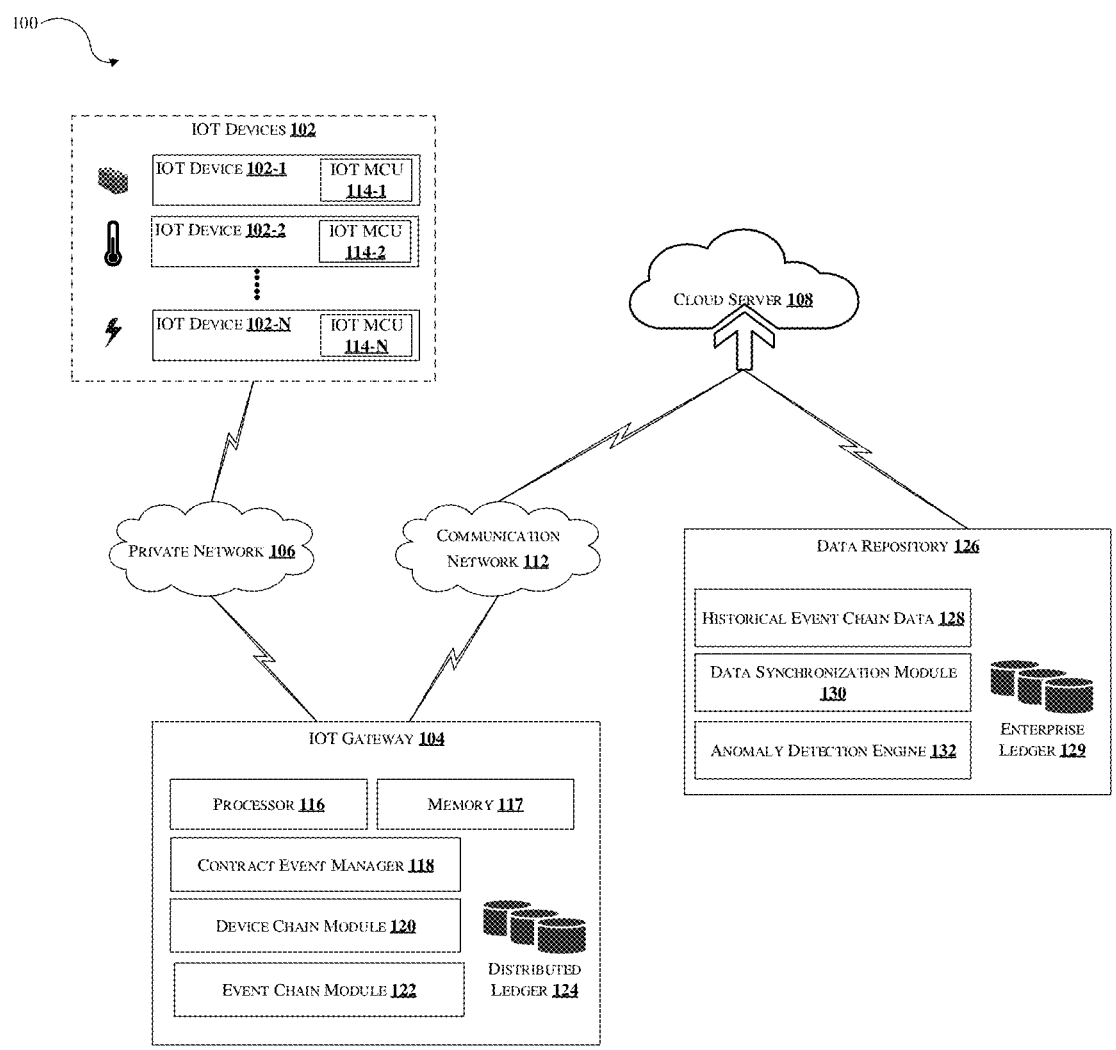
FIG. 1a is a simplified schematic diagram of an Internet of things (IOT) security framework using blockchain specifications in accordance with some embodiments of the present disclosure.

It should be appreciated by those skilled in the art that any block diagrams herein represent conceptual views of illustrative systems embodying the principles of the present subject matter.

DETAILED DESCRIPTION OF EXAMPLE EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for enabling IOT security framework using Blockchain specifications for an access manager. The IOT security framework is a decentralized IOT security platform that leverages the advanced communication and blockchain security thread model to protect IOT eco-systems. The platform is designed based on multi-chain data schema including a device chain and an event chain. The multi-chain data schema uses a time-envelope mechanism to generate an event to connect different device chains and enforce a set of security rules through smart contracts. The device chain protects identity and privacy of devices based on certain rules within the device chain. The event chain protects data integrity and confidentiality against malicious packets, unauthorized devices, weak encryption and man-in-the-middle attacks. The present disclosure relates to a cryptography system for trusted computing over peer-to-peer IOT networking supporting by cloud services allowing for analytics, security prevention and to store global ledger. Thus, the present disclosure enables a decentralized and distributed IOT secure platform with multichain architecture that protect against unauthorized devices, and malicious packets. The present disclosure also enables permissioned access to permanent time-stamped event records, keyless, peer-based authentication thereby reducing cloud traffic and eliminating certificate management overhead with mechanisms to facilitate, verify and enforce permission to access devices. The present disclosure also provides a well-designed, agile and scalable security solution for globally available IOT devices with improved privacy and reliability. The decentralized and distributed architecture allows the tracking of millions of connected devices, enabling processing of transactions and coordination between devices, thus allowing significant savings in IOT manufacturing process. The decentralized approach eliminates single point of failure, thereby creating a more resilient ecosystem for devices to operate.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a is a simplified schematic diagram of an Internet of things (IOT) security framework using blockchain specifications in accordance with some embodiments of the present disclosure. As shown in FIG. 1a, an IOT security system 100 includes one or more components such as one or more IOT devices 102-1, 102-2, . . . 102-N (hereinafter collectively referred to as IOT devices 102), and an IOT gateway device (hereinafter referred to as IOT gateway) 104 connected via a private network 106. The private network 106 may be a personal area network (PAN) using wireless technology like Bluetooth, ZigBee, Z-wave for exchanging data over short distance in a home-based network. The IOT security system 100 further includes a cloud server 108 and a data repository 126 communicatively coupled with the IOT gateway 104 via a communication network 112. The communication network 112 may include, without limitation, a direct interconnection, local area network (LAN), wide area network (WAN), wireless network (e.g., using Wireless Application Protocol), the Internet, etc.

The IOT devices 102 may be a physical entity (PE) including any object or environment. For example, the IOT devices 102 may be sensors, actuators, controllers, or any external devices capable of being controlled by service or application. In one embodiment, the IOT devices 102 comprise IOT Micro-controller (MCU) 114-1, 114-2, . . . 114-N (hereinafter referred to as IOT MCU 114) capable of enabling operation of the IOT devices 102. Each IOT device 102 may be embedded with a proprietary microcode in the IOT MCU 114 at the time of manufacture, to allow embedding of blockchain onto the IOT devices 102. The microcode in the IOT MCU 114 also enables the functionality to generate encrypted blocks, micro-ledger and store nano-transactions. By using the proprietary microcode, the IOT devices 102 is provided with tamper-resistant features and paired through a key exchange process with Hardware Security Module (HSM) (not shown). The HSM enables key exchange and hashing-less authentication and provides crypto-processing. The IOT MCU 114 is booted as cryptographic check of the resident firmware to ensure that signatures match the last known good version. This helps to avoid attacks involving a downgrade to a previous version of the firmware and clone firmware, as well as attempts to manipulate the firmware and skinny ledger stored in on-board flash memory within the IOT MCU 114.

The IOT gateway 104 may be a physical device or an application that serves as the connection establishing points between the IOT devices 102 and the cloud server 108 that enable additional security for the IOT network. The IOT gateway 104 comprises a processor 116, memory 117 communicatively coupled with the processor 116. The IOT gateway 104 also comprises an access manager module (not shown) that enables only authorized application to access a resource such as the IOT devices 102. The access manager module comprises at least a contract event manager 118, a device chain module 120 and an event chain module 122 coupled with the processor 116. The IOT gateway 104 also comprises a distributed ledger 124 in the memory 117. The contract event manager 118 enables mutual authentication between the IOT devices 102 to enable permissioned access to event chain data. The device chain module 120 is configured to generate a device chain as a part of the decentralized distributed ledger 124. The users are mapped not the device chain to access the device according to clear access right riles to control the IOT devices 102. The event chain module 122 is capable of maintaining a list of historical data blocks of all events for a given device block in the device chain. The event chain module 122 generates an event chain that is a typical blockchain storing a group of events which are added into the event chain at periodic intervals of time.

The cloud server 108 is a typical logical server that is built, hosted and delivered through a cloud computing platform over the communication network 112. The cloud server 108 is capable of providing shared storage and processing capabilities, security and control similar to those of a dedicated server. The cloud server 108 is coupled with a data repository 126 for storing historical event chain data 128, and enterprise ledger (alternatively referred to as global ledger) 129. The cloud server 108 provides a cloud-based service using Machine learning, and artificial intelligence global block chain ledger and context aware analysis for threat detection and anomalies identification. In one embodiment, the cloud server 108 includes one or more modules including a data synchronization module 130 and an anomaly detection engine 132. The data synchronization module 130 enables synchronization of the enterprise ledger 129 with the distributed ledger 124 of the IOT gateway 104 to retrieve the stored data from the distributed ledger 124 for a predetermined time period. The anomaly detection engine 132 is capable of detecting anomalous patterns and improve the detection of new threads and security challenges.

Figure 1B:
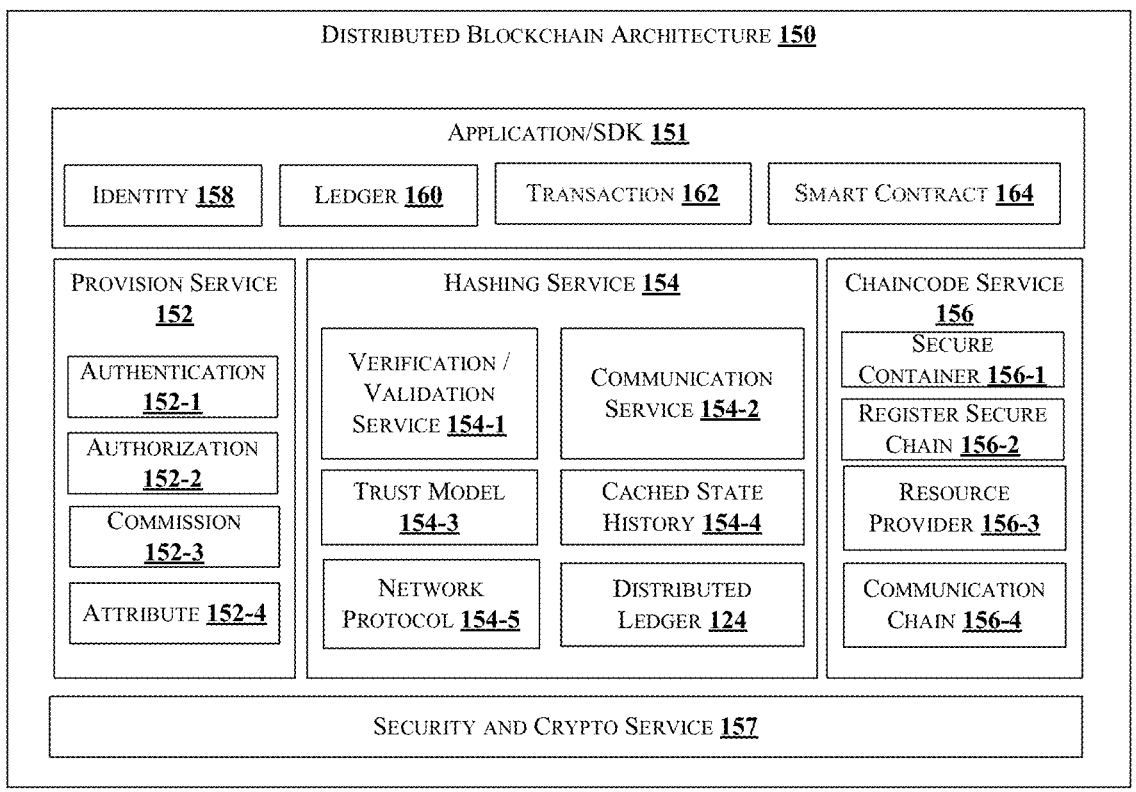
FIG. 1b is an overview of a distributed Blockchain architecture in accordance with some embodiments of the present disclosure.

FIG. 1b is an overview of a distributed Blockchain architecture 150 for access manager in accordance with some embodiments of the present disclosure. As illustrated, the distributed Blockchain architecture (hereinafter referred to as DBA) 150 of the access manager provides at least one services including an application/SDK 151, provision service 152, a hashing service 154, a chaincode service 156 and a security and crypto service 157. The DBA 150 also insures only authorized entities to be integrated in the security framework environment so that only authorized applications can access a resource such as IOT devices 102. The DBA 150 of the access manager enables horizontal security between a data provider and a data consumer and in addition, insures confidentiality, integrity of the messages and peer authentication based on Blockchain security. The application/SDK 151 comprises identity of user 158, ledger 160, at least one transaction 162 and pre-defined smart contracts 164. The user may be an entity granting access to a resource. For example, the user refers to a person (human) authorized to access the resource by the owner of the resource. The access manager makes the decision to generate an access token to the application for accessing a resource. This decision is made on behalf of the user. The Trust Manager authenticates the user which then authorizes the Trust Manager to issue an access-token. The ledger 160 may be Distributed transactional ledgers that store the transactions 162 and are updated by the hashing service 154. The smart contracts 164 may be Programmable Ledger that provides ability to run specific rules for example, business logic against the Blockchain.

The provision service 152 enables functionality including authentication 152-1 of users, authorization 152-2 of devices, commission 152-3 of devices and stores at least one attribute 152-4 generated for the IOT devices 102. The hashing service 154 provides functionality comprising verification/validation service 154-1 and communication service 154-2. The hashing service 154 also stores trust model 154-3, cache state history 154-4, network protocol 154-5 and the distributed ledger 124. The hashing service 154 updates the distributed ledger 124 in response to event data updation. The chaincode service 156 generates a secure container 156-1 in the event of execution of pre-defined smart contracts 164. The secure container 156-1 comprises a virtual object of the IOT devices 102 and at least one attribute 152-4 of the IOT devices 102. A register secure chain 156-2 stores the secure container 156-1 and identifies of the resource provider 156-3. The resource provider 156-3 may be the entity controlling and enabling access to a resource. In various embodiments, the resource provider 156-3 enforces security by checking the access-token and passing the request to the related resource. This role can be implemented by any entity involved at data transfer. The application that consumes the resources on behalf of the user may be referred to as resource consumer. The communication chain 156-4 may enable communications with other components of the chaincode service 156 or the application/SDK 151.

Figure 1C:
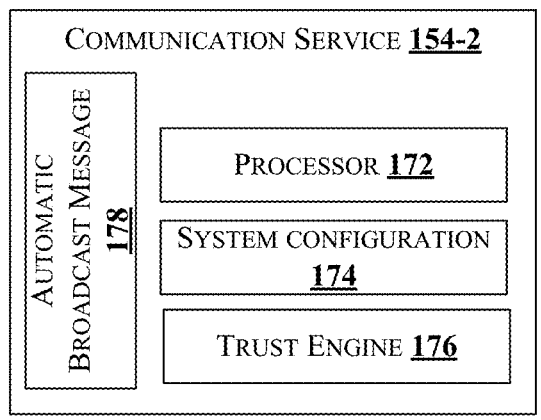
FIG. 1c represents a block diagram of a communication service of the distributed Blockchain architecture of FIG. 1b in accordance with some embodiments of the present disclosure.
Figure 1D:
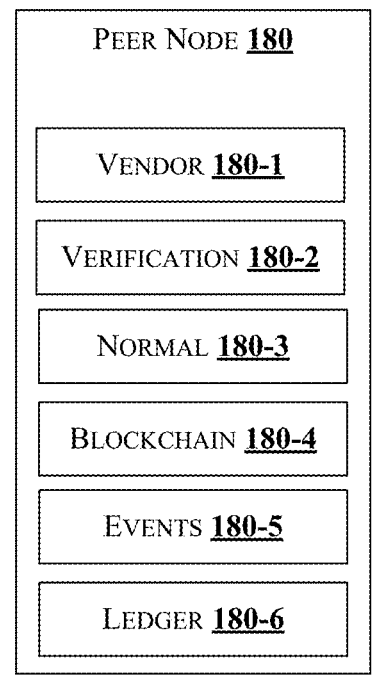
FIG. 1d represents a block diagram of a peer node of the distributed Blockchain architecture of FIG. 1b in accordance with some embodiments of the present disclosure.

The communication service 154-2 of the hashing service 154 is best illustrated in FIG. 1c. The communication service 154-2, as illustrated includes at least a processor 172, system configuration 174 and a trust engine 176. The trust engine 176 integrates authorization and access control mechanisms for accessing a resource. Further, the trust engine 176 also enables ordering of the transactions. The communication service 154-2 provides automatic broadcasts by transmitting automatic broadcast messages 178 to all peer nodes and applications. An exemplary peer node 180 is illustrated in FIG. 1d.

Figure 1E:
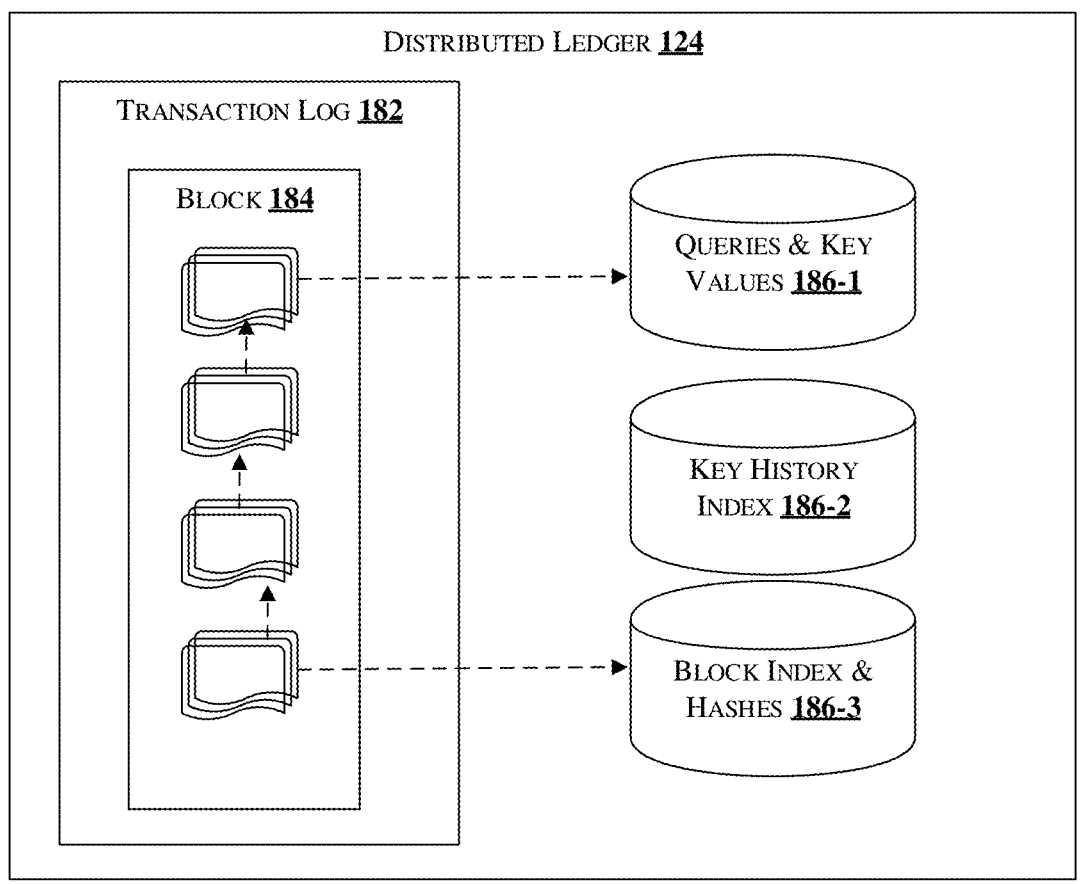
FIG. 1e represents a block diagram of a distributed ledger of the distributed Blockchain architecture of FIG. 1b in accordance with some embodiments of the present disclosure.

The peer node 180 may be a node on the communication network 112 maintaining the state of the distributed ledger 124 and managing Blockchain codes. The communication network 112 comprises one or more peer nodes. As illustrated, the peer node 180 may be a vendor node 180-1, a verification node 180-2, a normal node 180-3, and a Blockchain node 180-4. The peer node 180 is configured to manage the event updation, store the events 180-5 in the ledger 180-6 and delivers the events 180-5 to subscriber nodes and vendor nodes 180-1. The ledger 180-6 may be for example, the distributed ledger 124 as illustrated in FIGS. 1a and 1b. An exemplary distributed ledger 124 is illustrated in FIG. 1e.

The distributed ledger 124, as illustrated comprises a transaction log 182 storing at least one block 184 for each transaction. The block 184 may be encrypted block generated by the IOT MCU 114 of the IOT devices 102. The distributed ledger 124 also comprises one or more databases to store keys and hashes. In one embodiment, the distributed ledger 124 stores for example, queries and key values 186-1, key history index 186-2 and block index and hashes 186-3. Queries and key values 186-1 comprises latest written key values and index for use in transaction, supported keyed queries, composite key queries and key range queries. The key history index 186-2 stores tracking history of a key. The block index and hashes 186-3 stores block hashes and transaction IDs.

Figure 2A:
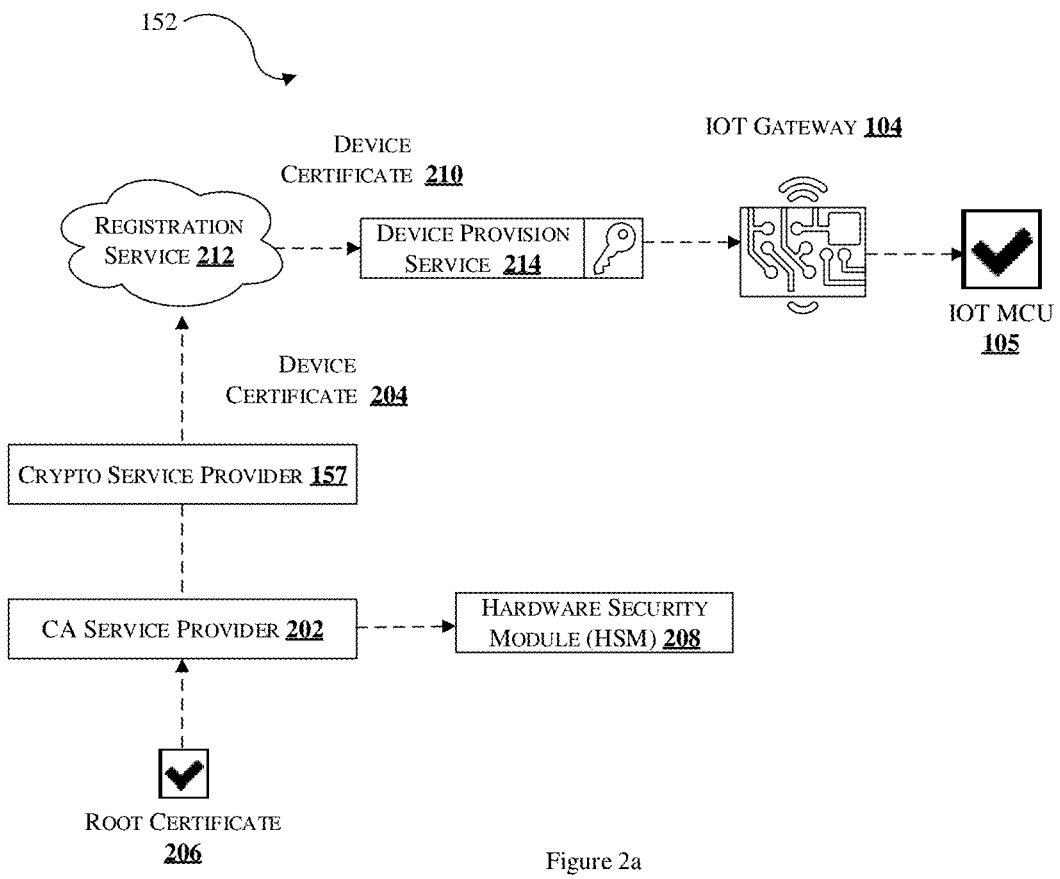
FIG. 2a is a schematic diagram illustrating an exemplary flow for provision service and/or member service in accordance with some embodiments of the present disclosure.

FIG. 2a is a schematic diagram illustrating an exemplary flow for provision service and/or member service 152 of FIG. 1b in accordance with some embodiments of the present disclosure. As illustrated, the provision service 152 is a commissioning process that is the physical deployment, addressing, and logical binding of nodes to form a functional network. For example, commissioning covers a wide range of tasks including surveying the radio and physical environment, placement of devices, configuration of parameters, application binding, optimization of network and device parameters, and testing and verification of correct operation.

As shown in FIG. 2a, a Certificate Authority (CA) service provider or CA server 202 is a default implementation of the provision services 152 provider interface. The CA service provider 202 issues a long-term identity and device signature certificate (hereinafter referred to as device certificate) 204 for an IOT devices 102. The device certificate 204 certifies the ownership of a public key by the named subject of the device certificate 204. The CA service provider 202 generates a root certificate 206 that may be an identity and device signature certificate of the IOT devices 102 and issues the device certificate 204 using the root certificate 206. The CA service provider 204 stores the device certificate 204 with secure keys in a Hardware Security Module (HSM) 208 of the IOT devices 102. The CA service provider 202 in a cluster share the same database for keeping track of identities and certificates.

The crypto service provider 157 implements encoding and decoding functions to implement strong user authentication. In one embodiment, the crypto service provider 157 uses encoding and decoding functions to generate the device certificate 210 with secure keys associated with the IOT devices 102. A registration service 212 receives the device certificate 210 and forwards the device certificate 210 to a device provision service 214 along with secure keys. The device certificate 210 may be then transmitted to the IOT gateway 104 and to IOT MCU 105.

Figure 2B:
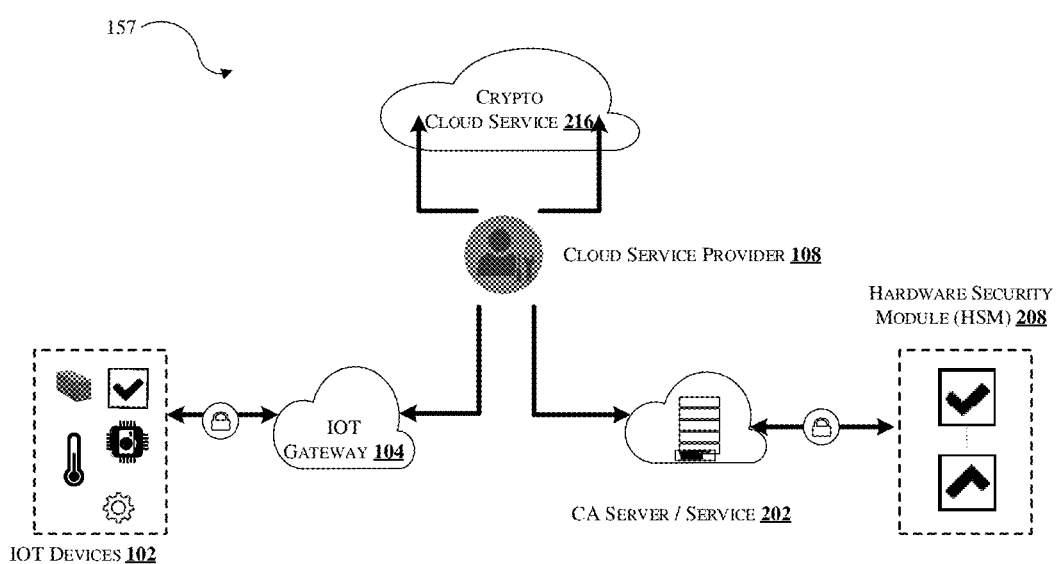
FIG. 2b is a schematic diagram illustrating an exemplary flow for security and crypto service in accordance with some embodiments of the present disclosure.

FIG. 2b illustrates an exemplary flow for security and crypto service or crypto service provider 157. The crypto service provider 157 abstract crypto standards that include hardware and software to enable different pluggable crypto algorithms and techniques for example, Diffie-Hellmaa, Elliptic curve and Rivest-Shamir-Adleman (RSA). The crypto service provider 157 provides the flexibility to provision keys and other sensitive data at any point in the IOT devices 102. In one embodiment, the crypto service provider 157 has flexibility for highly specialized key management requirements such as the provisioning of key splits at different stages during commission in device management. For unique keys, there are also features to protect against key duplication in multiple devices. As illustrated, the uniqueness of such keys is checked at multiple locations during a provisioning event. This includes duplicate checking at the Crypto cloud service 216 located in the cloud of the chip or device manufacturer and at the Crypto client library or SDK compiled with the device firmware. The crypto service 157 supports different types of HSM 208 and support multiple cryptographic algorithms and techniques. For example, the crypto service 157 supports Elliptic Curve Diffie-Hellman (ECDH) for Encryption key establishment, and Elliptic Curve Digital Signature Algorithm (ECDSA) for Digital signatures for message/data signing operations.

Figure 2C:
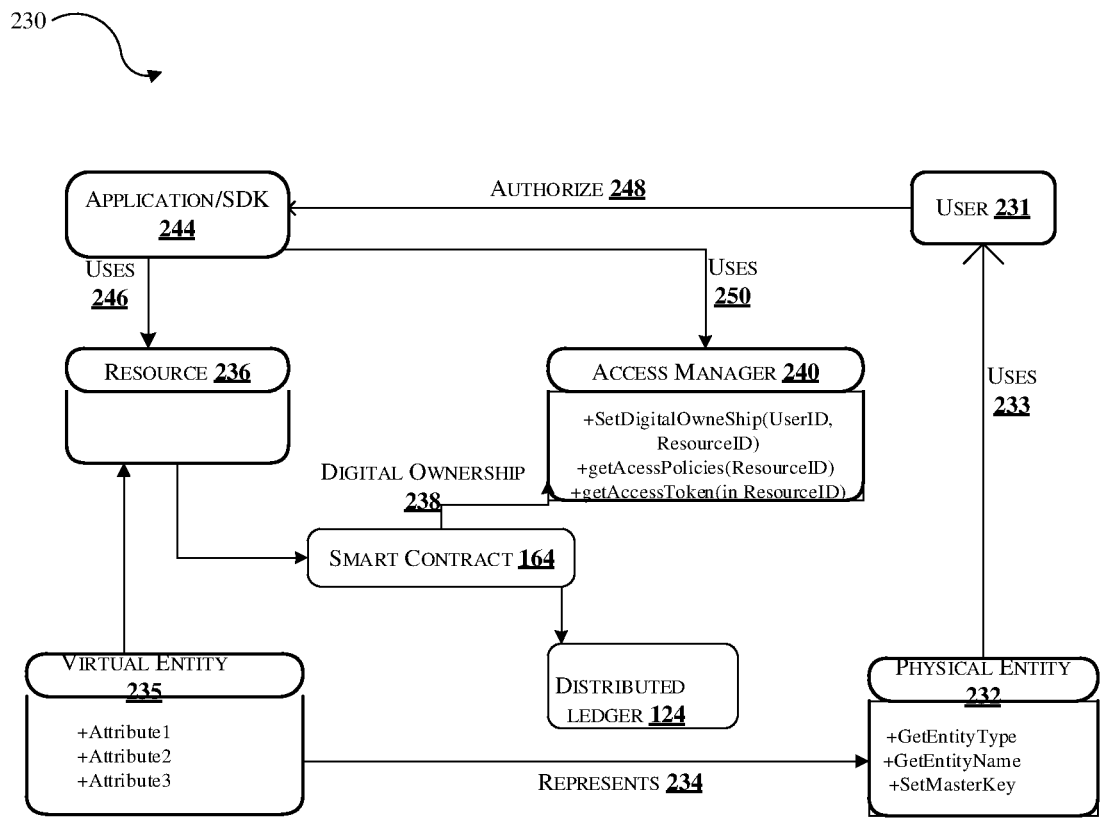
FIG. 2c is a schematic diagram illustrating an exemplary flow for enabling a smart contract in accordance with some embodiments of the present disclosure.

FIG. 2c is a schematic diagram illustrating an exemplary flow 230 for enabling a smart contract. As illustrated, a physical entity 232 is owned by a user 231 but this ownership has no representation in the digital world. An example of Physical Object is a thermostat used 233 by the user 231. Conceptually, the physical entity 232 will be represented 234 in the digital world as a Virtual Entity 235. The Virtual Entity 235 represents 234 the features of the object in the digital world. Therefore, the Virtual Entity 235 represents 234 the single Physical Entity 232, and the Physical Entity 232 can be represented by more than one Virtual Entity 235. A device embeds many Virtual Objects not necessarily exposed to the external world. A Resource entity 236 exposes some Virtual Objects or a composition of Virtual Objects to the external world as a single software entity, and the Resource 236 is associated to zero or more Virtual Objects. In the digital world, the Resource 236 is owned by the user 231 like a physical entity 232 is owned by the user 231 in the physical world.

In one embodiment, the setting of digital ownership 238 of the resource 236 is implemented through the Access Manager 240. The Access manager 240 creates a smart contract 164 for the resources 236 available in the system and each resource 236 is owned by the user 231 who registered the resource 236. The smart contract 164 may be stored in the user chain 165 temporarily and then permanently stored in the distributed ledger 124. In various embodiments, the user chain 165 may share the user policy and the user identify in the distributed ledger 124. Digital ownership 238 is declarative and Blockchain security will implement at runtime the verification of such digital ownership 238 and associated security. In operation, the Application/SDK 244 that uses 246 the resource 236, requests for device provision by requesting a scan of the entire network. The user 231 authorizes 248 the application/SDK 244 to use 246 the resource 236. The application/SDK 244 (also referred as application/SDK 151) uses 250 the access manager 240 to get issued with a token to access the resource 236.

Figure 3:
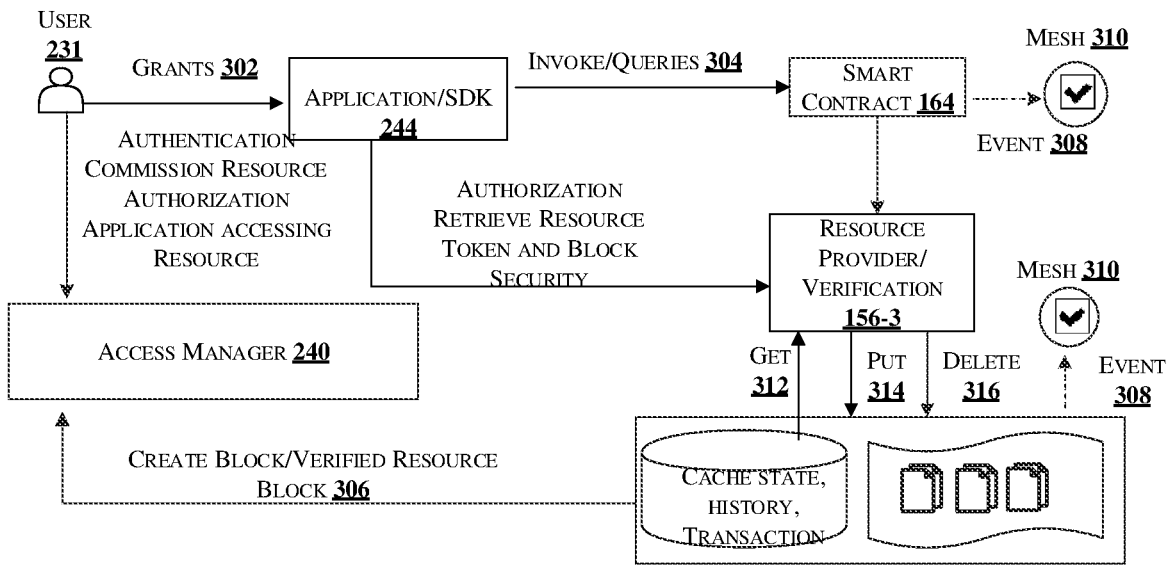
FIG. 3 is a simplified schematic diagram illustrating an exemplary Blockchain security functional architecture flow in accordance with some embodiments of the present disclosure.

The functional architecture and application flow is shown in FIG. 3. As illustrated, the user 231 authenticates towards the access manager 240. The user 231 commissions the resource 236 to device management through the provision service 152. This way, the users 231 may setup the ownership of the resource 236 and the smart contract 164. Later, the application/SDK 244 accesses the access manager 240 to retrieve the root certificate 206, signing certificates and keys for a specific resource on behalf of an authenticated user. If the user 231 is not already authenticated to the access manager 240, the user 231 shall authenticate. Once authenticated, the user 231 grants 302 the application/SDK 244 to retrieve the signing certificates and keys. In other embodiments, the access manager 240 may execute the smart contract 164 after accessing the contract terms and conditions. The application/SDK 244 may be is configured to access the distributed ledger 124.

Setup policies governing the network that has access to modify and create Blockchain. Using the access token, to create a channel, send a configuration transaction to the ordering service which specifies virtual object of the channel, ACL policies and anchor peers. Using the access token, the application/SDK 244 can securely deploy Blockchain on the channel with appropriate verification policy. The application/SDK 244 invokes or queries 304 the smart contract 164 to access the resource 236. Each node will decide whether to accept or reject a transaction, while the communication service 154-2 will sort all transactions 162 within a defined period into a block of automatic broadcast messages 178 to be broadcast. The resource provider 156-3 will verify transaction 162 endorsement and satisfy the policy and transaction. This response is send back to application/SDK 244 along with endorsement signature. The application/SDK 244 assembles the endorsement into a transaction payload and broadcasts to the communication service 154-2, delivering transactions 162 as blocks to all peers on a channel.

The blocks of transactions are "delivered" to all peers on the channel. The transaction 162 within the blocks are validated and to ensure no changes to ledger state. Transactions 162 in the block are tagged 306 as being valid or invalid. Each peer appends the block to channel's chain, and for each valid transaction 162 write sets are committed to current state database. An event 308 is broadcast, to notify the application/SDK 244 the transaction has been immutable appended to the chain (MESH 310), as well as notified whether the transaction is validated or invalidated. The Data Source decrypts the request, encrypts the response and returns (GET) 312 the encrypted response to the resource provider 156-3. The resource provider 156-3 returns (PUT) 314 the encrypted response to the application/SDK 244. In another embodiment, the resource provider 156-2 may delete (DELETE) 316 the encrypted response from the distributed ledger 124.

Figure 4:
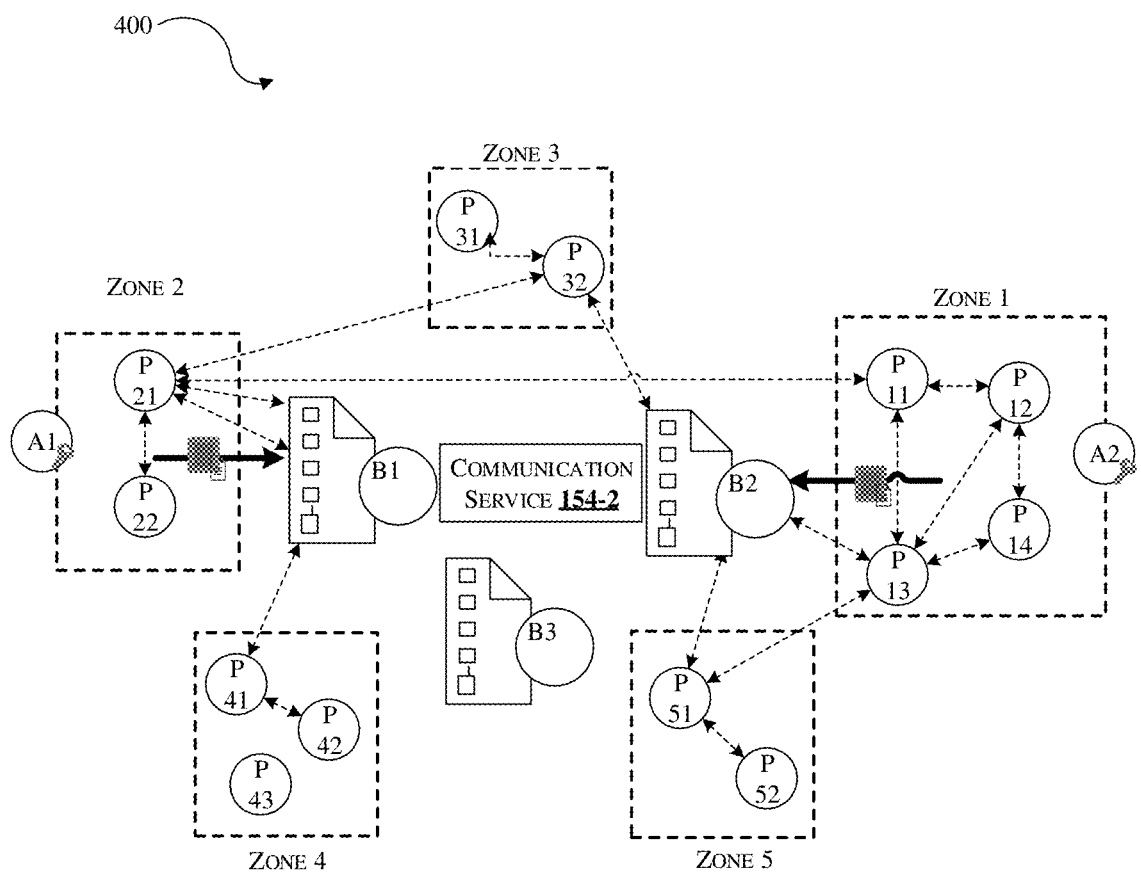
FIG. 4 is a simplified schematic diagram illustrating a N-member edge device network with multiple channels in accordance with some embodiments of the present disclosure.

FIG. 4 is a simplified schematic diagram illustrating a N-member edge device network 400 with multiple channels. As illustrated, the network 400 comprises multiple channels or zones including Zone 1, Zone 2, Zone 3, Zone 4 and Zone 5. The scenario includes an application A1, A2 each submitting a transaction to the communication service 154-2. Each Zone have a peer node (P) on the communication network 112 for sending the transactions 162 and to interact with the distributed ledger 124. For example, as shown in FIG. 4, the Zone 1 has peer nodes P11, P12, P13 and P14 and the application A2 for submitting the transactions 162. The Zone 2 comprises the Application A1 and peer nodes P21 and P22, the Zone 3 comprises peer nodes P31 and P32. Further, the Zone 4 comprises peer nodes P41, P42 and P43, the Zone 5 comprises peer nodes P51 and P52. This flow assumes that a channel is set up and running. The network 400 also comprises blockchain nodes such as B1, B2, and B3 to perform the transactions 162. The user of the applications A1 and A2 user may be registered and enrolled with the CA service provider 202 and received back the relevant cryptographic material, which is used to authenticate to the communication network 112. The communication service 154-2 performs timestamping on the transactions 162 sent by the applications A1 and A2.

The blockchain code (containing a set of key value pairs representing the initial state of the application) is installed on the peer nodes and instantiated on the channel. The blockchain code contains logic defining a set of transaction instructions and the agreed upon an application request. A verification policy has also been set for this blockchain code, stating that both V0, V1 and V2 must verified any transaction. The steps of a transaction mechanism that takes place during a standard asset exchange are illustrated in FIGS. 5a-5g. the standard transaction mechanism involves at least one verification node 502, at least one committer or normal node 504, at least one transaction or blockchain node 506 that uses the communication service 154-2 for processing the transaction.

Figure 5A:
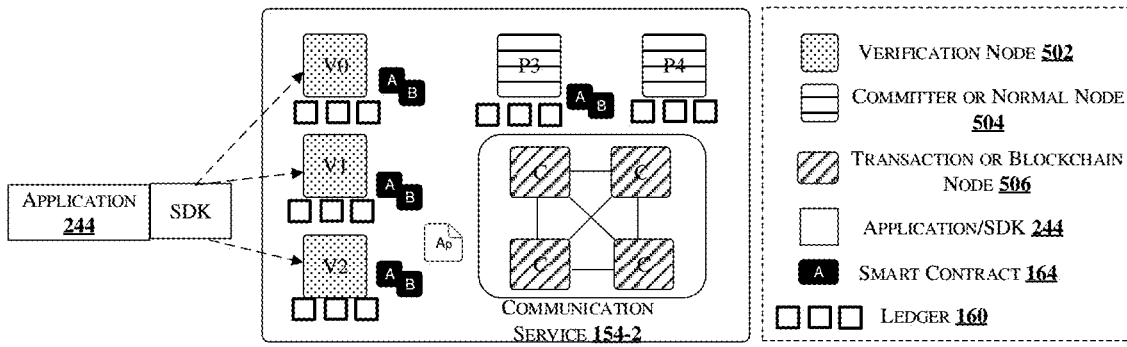
FIG. 5a is a simplified flow diagram illustrating a proposed transaction in accordance with some embodiment of the present disclosure.
Figure 5B:
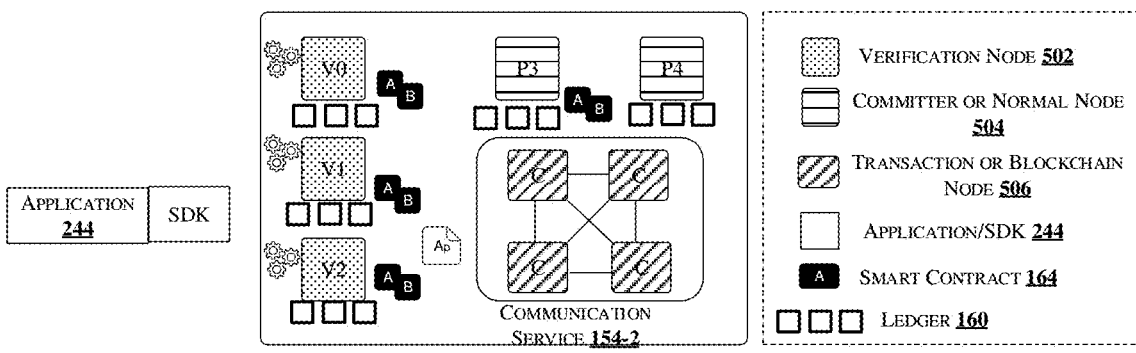
FIG. 5b is a simplified flow diagram illustrating execution of the proposed transaction in accordance with some embodiment of the present disclosure.

As illustrated in FIG. 5a, the application or client SDK 244 initiates a transaction. In one embodiment, the application/SDK 244 sends a request to digital interaction or transaction proposal for blockchain A. The request targets peer nodes V0, V1 and V2 502 to sign for a verification policy. P3 and P4 504 are not involved to sign for the verification policy. Next, the transaction proposal is constructed. An application 244 leveraging a supported SDK utilizes one of the available API's which generates a transaction proposal. The application/SDK 244 takes the users cryptographic credentials to produce a unique signature for this transaction proposal. Further, the verified peer nodes V0, V1 and V2 502 verify the signature and execute the transaction In one embodiment, as illustrated in FIG. 5b, the verification peer nodes V0, V1 and V2 502 verify the signature (using Membership Service Provider MSP) and determine if the submitter is properly authorized to perform the proposed transaction using the channel's access manager ACL. Each of the peer nodes V0, V1 and V2 502 execute the proposed transaction upon determination. None of these executions will update the ledger (interchangeably referred to as distributed ledger) 160. Each execution will capture a set of Read and Write data called RW sets which will now flow in the network 400. Upon execution, the proposal response is generated and transmitted to the application 244.

Figure 5C:
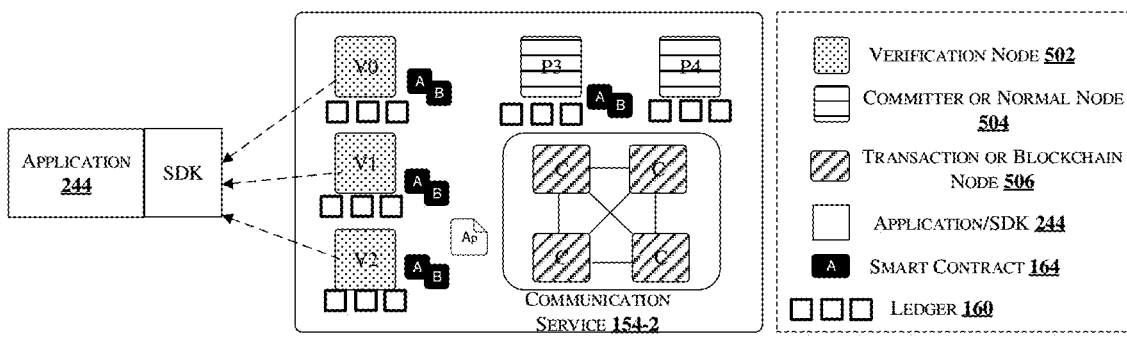
FIG. 5c is a simplified flow diagram for receiving proposal response from peers in accordance with some embodiment of the present disclosure.

In one embodiment, as illustrated in FIG. 5c, the application 244 verifies the signature of the verification peer nodes 502 and compare the proposal responses to determine if the proposal responses are the same and verification policy has been fulfilled. The architecture is such that even if an application 244 chooses not to inspect responses or otherwise forwards an unendorsed transaction, the policy will still be enforced by peers and upheld at the commit validation phase. Upon verification, the proposal response is transmitted to the application 244. The application 244 then submits the proposal response for broadcast.

Figure 5D:
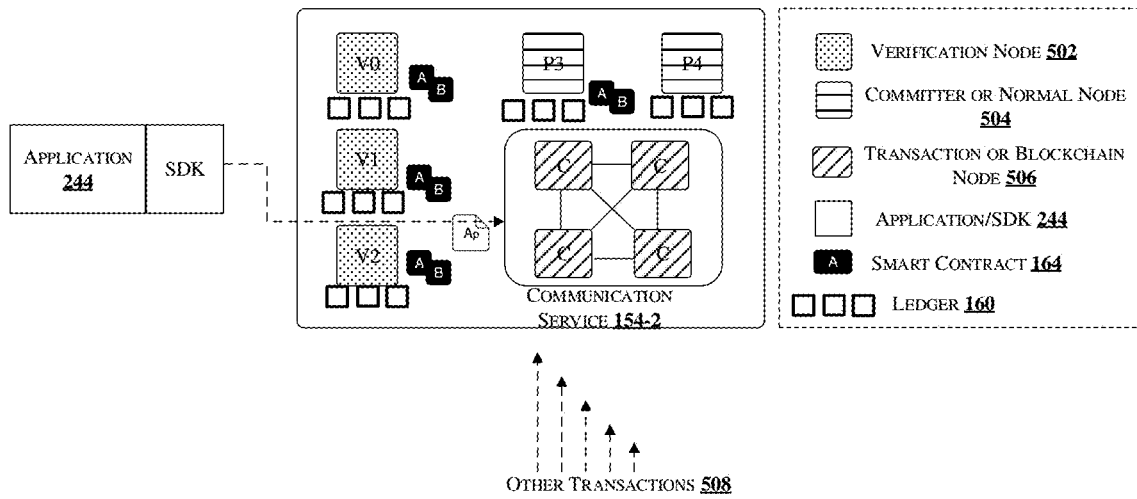
FIG. 5d is a simplified flow diagram for illustrating a broadcast transaction in accordance with some embodiment of the present disclosure.
Figure 5E:
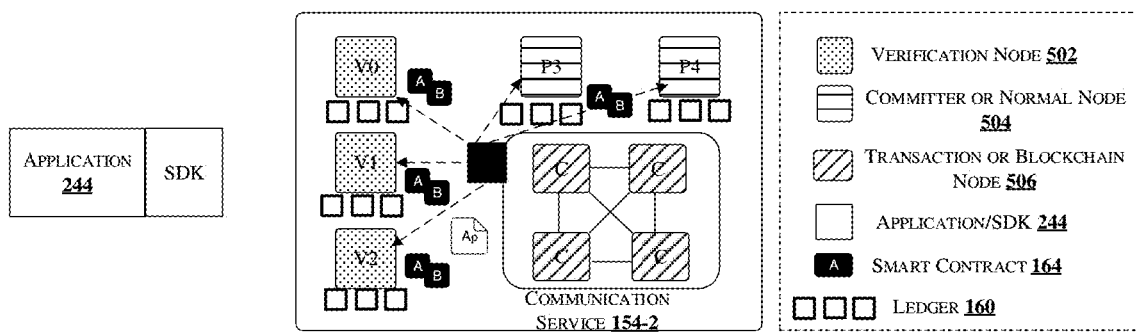
FIG. 5e is a simplified flow diagram for illustrating delivery of blocks to peer nodes in accordance with some embodiment of the present disclosure.

In one embodiment, as illustrated in FIG. 5d, the application 244 submits the proposal responses for broadcast. The application 244 "broadcast" the transaction proposal and response within a "transaction message" to the communication service 154-2. The transaction will contain the read/write (RW) sets, the verification node signatures and channel ID. The communication service 154-2 does not read transaction details, it simply broadcast from all channel in the network, orders them chronologically by channel, and create blocks of transactions per channel. The communication service 154-2 happens across the blockchain network 400 in parallel with transactions submitted by other applications or transactions 508. The communication service 154-2 collects transactions into blocks and delivers the transaction to all peers such as verification nodes 502, and committer/normal nodes 504 as illustrated in FIG. 5e.

Figure 5F:
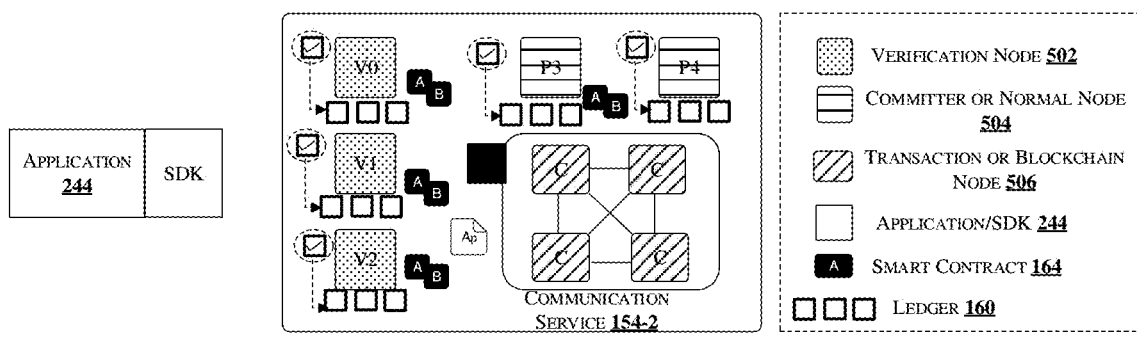
FIG. 5f is a simplified flow diagram illustrating validation of blocks of the proposed transaction in accordance with some embodiment of the present disclosure.
Figure 5G:
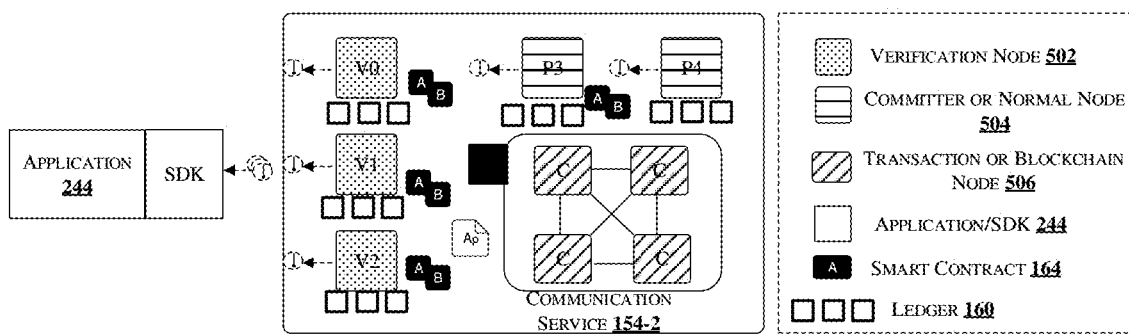
FIG. 5g is a simplified flow diagram for updating ledger in accordance with some embodiment of the present disclosure.

The peers validate the transactions and perform commit on the validated transactions. In one embodiment, as illustrated in FIG. 5f, the blocks of transactions are "delivered" to all peers such as verification nodes 502 and committer/normal nodes 504 on the channel. The transactions within the block are validated to ensure verification policy is fulfilled and to ensure that there have been no changes to ledger state for read set variables since the read set was generated by the transaction execution. Transactions in the block are tagged as being valid or invalid. Upon validating and committing the transactions, the ledger 160 is updated and the transaction is notified to the user.

In one embodiment, as illustrated in FIG. 5f, each peer such as verification nodes 502 and committer/normal nodes 504 (hereinafter referred to as peer nodes 502, 504) appends the transaction block to the channel chain, and for each valid transaction, the peer writes to the ledger 160 and commit to a predetermined database for example, MongoDB. An event is generated to notify the application 244 that the transaction has been committed and added to the ledger 160. The peer nodes 502, 504 notifies the transaction commit to at least one application 244 to which the peer nodes 502, 504 are connected.

IOT Gateway

Figure 6A:
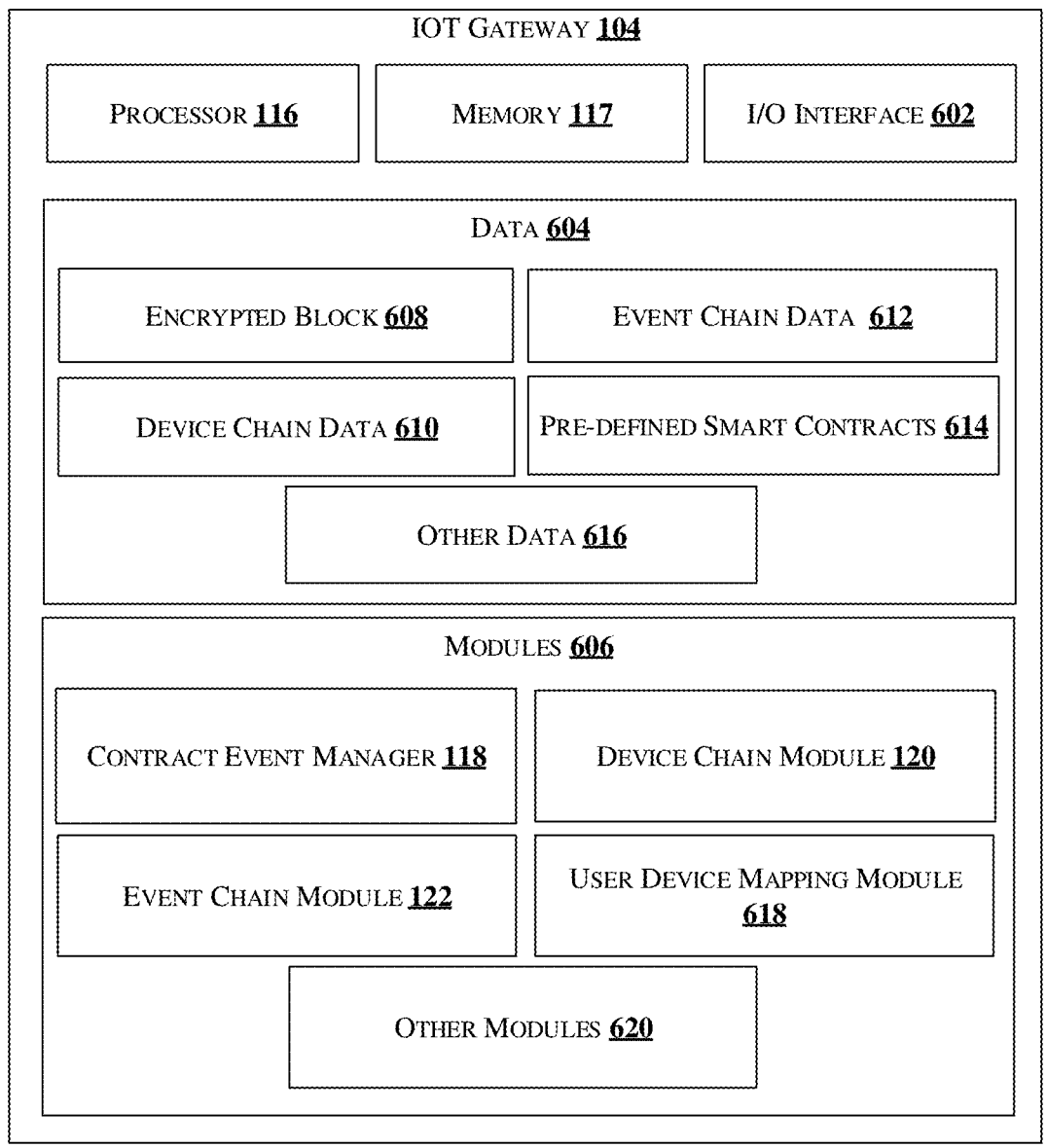
FIG. 6a illustrates a block diagram of an IOT gateway device enabling security using Blockchain specifications in accordance with one embodiment of the present disclosure.

The IOT gateway 104 of FIG. 1a may be typical IOT gateway or edge device as illustrated in FIG. 6a. The IOT gateway 104 comprise the processor 116, the memory 117, and an I/O interface 602. The I/O interface 206 is coupled with the processor 202 and an I/O device. The I/O device is configured to receive inputs via the I/O interface 602 and transmit outputs for displaying in the I/O device via the I/O interface 602. The IOT gateway 104 further comprises data 604 and modules 606. In one implementation, the data 604 and the modules 606 may be stored within the memory 117. In one example, the data 604 may include encrypted block 608, device chain data 610, event chain data 612, predefined smart contracts 614 and other data 616. In one embodiment, the data 604 may be stored in the memory 117 in the form of various data structures. Additionally, the aforementioned data can be organized using data models, such as relational or hierarchical data models. The other data 616 may be also referred to as reference repository for storing recommended implementation approaches as reference data. The other data 616 may also store data, including temporary data and temporary files, generated by the modules 606 for performing the various functions of the IOT gateway 104.

The modules 606 may include, for example, the contract event manager 118, the device chain module 120, the event chain module 122, and a user device mapping module 618. The modules 606 may also comprise other modules 620 to perform various miscellaneous functionalities of the IOT gateway 104. It will be appreciated that such aforementioned modules may be represented as a single module or a combination of different modules. The modules 606 may be implemented in the form of software, hardware, combination of software and hardware and/or firmware.

In operation, the IOT gateway 104 is configured to enable a permissioned blockchain that not only performs user authentication but also mutual authentication between the IOT devices 102 thereby generating and securely recording operation and scenario based smart contracts 614. The IOT gateway 104 establishes a peer-to-peer network that authorizes nodes intending to join the network to operate as a Device Chain node and thus facilitates the permissioned distributed ledger system. Further, the IOT gateway 104 determines the resource requirements of the peer-to-peer network, and to validate the reliability of a node intending to join the peer-to-peer network. Further, the IOT gateway 104 (also known as BlockLock fabric) provides decentralized and autonomous security for devices or endpoints. Furthermore, the IOT gateway 104 is configured with a Time-sync envelope implementation that decides whether to keep a new packet or discard. The time-sync implementation eliminates malicious packet injection and malicious actors to access trust networks.

Figure 6B:
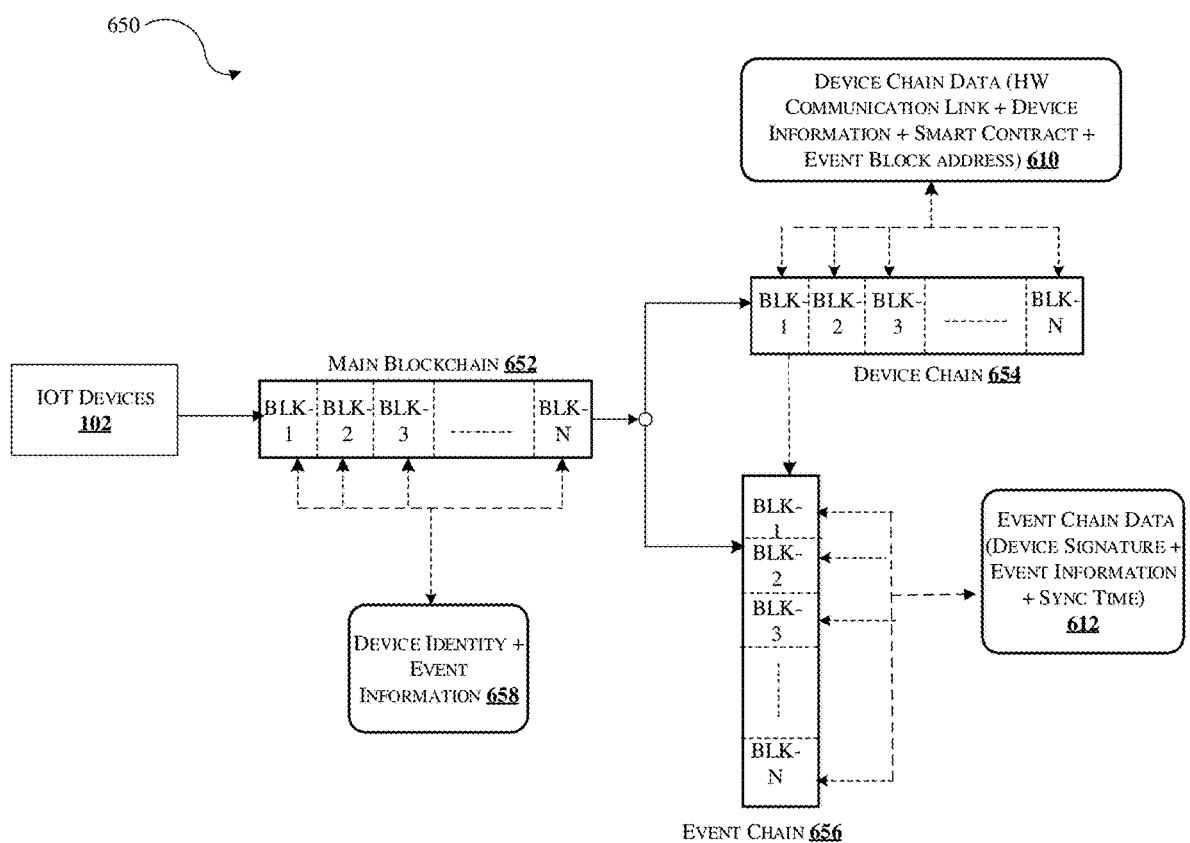
FIG. 6b is a simplified schematic diagram illustrating a multi-chain blockchain architecture for the IOT gateway device of FIG. 6a in accordance with one embodiment of the present disclosure.

To facilitate the blockchain for IOT devices 102, the IOT gateway 104 is configured with an IOT dedicated Multi-chain data scheme that includes a device Chain for device security and an event Chain for communication or transaction. The IOT gateway 104 implements a time-synchronization mechanism to validate data events for trusted computing to approach the secure data exchange required by the IOT devices 102. The proposed Multi-chain schema provides real-time data transactions with the device chain for trusting devices and with every device connected to corresponding event chain. FIG. 6b illustrates an exemplary multi-chain schema 650 that comprises multiple block chains.

In one embodiment, the multi-chain schema 650 comprises a main blockchain 652 including one or more blocks BLK-1, BLK-2, . . . BLK-N (collectively referred to as main block). The main blockchain 652 is divided into at least two blockchains, including a device chain 654 and an event chain 656. Both the device chain 654 and the event chain 656 are stored as part of the distributed ledger 124, 160. Each of the device chain 654 and the event chain 656 comprises one or more blocks BLK-1, BLK-2, . . . BLK-N (collectively referred to as device block and event block respectively). Each main block of the main blockchain 652 comprises device identity information and event information 658. Each device block of the device chain 654 comprises the device chain data 610 that includes HW communication link, device information, smart contract and event block address associated with each device block. Each event block of the event block chain 656 comprises the event chain data 612 that includes device signature, event information and synchronization time associated with each event block.

Figure 6C:
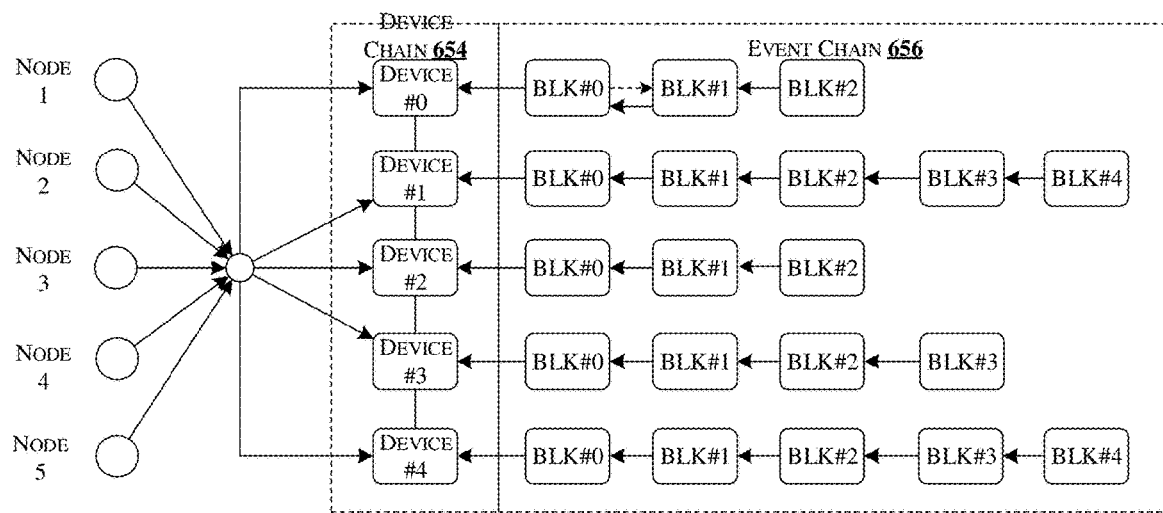
FIG. 6c is a simplified schematic diagram illustrating a multi-chain blockchain architecture for the IOT gateway device of FIG. 6a in accordance with another embodiment of the present disclosure.
Figure 6D:
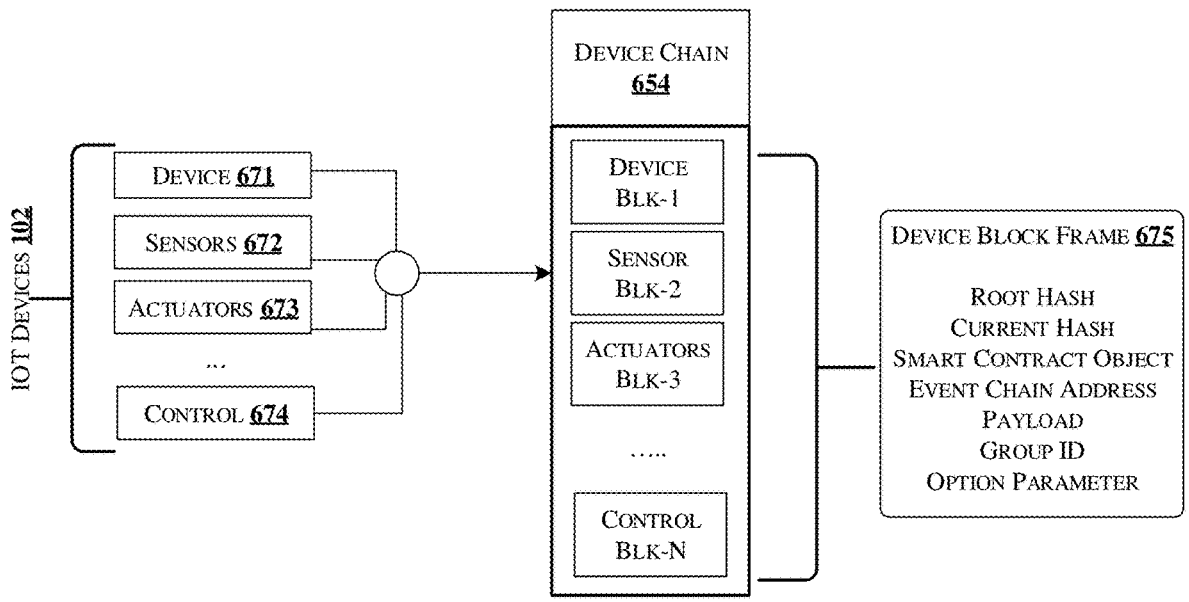
FIG. 6d is a simplified schematic diagram illustrating a device chain of the multi-chain blockchain architecture of FIGS. 6b & 6c in accordance with one embodiment of the present disclosure.

As illustrated in FIG. 6c, there are five nodes Node 1, Node 2, Node 3, Node 4 and Node 5 that may be the IOT devices 102 having the device chain 654 and the event chain 656. The device chain module 120 creates the device chain 654 with one device block for each device in the device chain 654. For example, the device chain 654 comprises at least 5 device blocks for five nodes, one device block for each IOT devices 102, namely Device #0, Device #1, Device #2, Device #3 and Device #4. For each device block, the event chain 656 comprises at least one event block associated with the device block. For example, the device block Device #0 comprises three event blocks such as BLK #0, BLK #1 and BLK #2. The device chain module 120 uses the device chain 654 to ensure that device identity and privacy information is not disclosed to unauthorized entity (confidentiality) and not modified in unauthorized or accidental manner(integrity). The device chain 654 is best illustrated in FIG. 6d.

As shown, the IOT devices 102 may include devices 671, sensors 672, actuators 673 and control systems 674. Each of the device chain 654 comprises a device block such as device BLK-1, sensor BLK-2, actuators BLK-3, . . . control BLK-N. Each device block has a device block frame 675 that comprises root hash, current hash/token, previous token, smart contract object, event chain address, payload, group ID and option parameter. The Payload may include information related to HW communication link, HW information and data originator. The device chain 654 comprises the device chain data 610 that includes a non-empty unique device address (ID) and corresponding event chain address along with payload information and smart contracts 614. During event generation, the devices identity and authentication of the IOT devices 102 are performed using the smart contracts 614 using time synchronization implementation as described above.

The user device mapping module 618 enables mapping of a user device in the device chain 654 with a set of mapping rights. The user on the device chain 654 must be able to access the IOT devices 102 according to clear access rights rules to control the IOT devices 102. The user device mapping module 618 ensures that only authorized user should be able to control the specific devices or sensors according to the setting or to only read the status of the devices or sensors. This allows the administrator to set access permissions by the addresses of the users, devices, or gateways. This access right setting is stored in all of the device chain 654 of the blockchain network, and is also shared among all nodes, gateways, and devices. Access and control of users and devices, and transaction authority, are recorded securely in the blockchain. The smart contract 614 can be carried out after the authority is verified compared to this record when the transaction occurs. The types of authority mapping include user-device/gateway mapping, user-user mapping, device/gateway-device mapping. The mapping rights comprises access rights, right to read, right to control/write, transaction rights and other rights. Access rights for example, indicates the right to access the devices or sensors, and able to specify a minimum access rating. A user or device will have a rating, meaning only a specific rating or higher is accessible. If access is not possible, all of the rights below are not available. In another example, the right to read may be a right to read the current state, and detailed authority can be specified as a separate string, and the right to read can be interpreted by the IOT devices 102 to determine whether the right to read is applicable or not.

Further, the right to control/write may be the right to control the device or to change the state. Detailed authority can be specified separately, and the right to control may be interpreted by the IOT devices 102 to determine whether it is applicable or not. Furthermore, the transaction rights specifies configurable rights related to manual and automatic transaction. Detailed authority can be specified separately, and the transaction rights can be interpreted by the IOT devices 102 to determine whether the transaction rights is applicable or not. The method of limiting the maximum transaction count and maximum one-time threshold during a specific period is effective. Other rights (specifying detailed rights) can be specified as a separate code or string and can be interpreted by the IOT devices 102 to determine whether other rights are applicable or not.

All transactions using permissioned blockchain network are determined to be transmitted according to the access right. That is, if a user A has no access to a device B, but still a transaction from A to B occurs, device B and all blockchain nodes will reject this transaction. In this case, the error can be reported to the intrusion detection node in the blockchain, and the administrator can immediately check for the details.

Figure 6E:
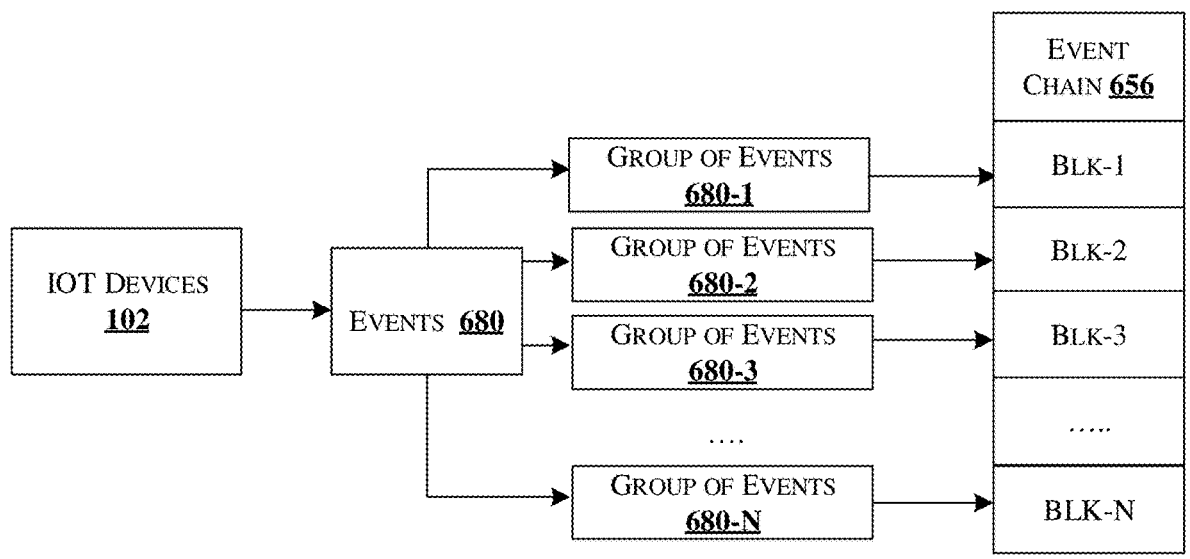
FIG. 6e is a simplified schematic diagram illustrating an event chain of the multi-chain blockchain architecture of FIGS. 6b & 6c in accordance with one embodiment of the present disclosure.

As illustrated in FIG. 6e, the event chain 656 is a list of historical data blocks of all events for a given device block in the Device Chain. Each event block represents data generated by a device at a given time. The Event Chain is essentially a normal blockchain, except this does not keep a copy of historical event blocks. In one embodiment, each IOT devices 102 may comprise a set of events 680 that comprises at least one group of events 680-1, 680-2, 680-3, . . . 680-N. The distributed ledger 124 tracks through the set of event hashes of the set of events 680 and device hashes, and do not allow every single event to alter the distributed ledger 124 on demand. The event chain module 122 break the set of events 680 into at least one group of events for adding/inserting into the event chain 656 in periodic intervals of time, without the need of having the event solved in groups of events as blocks. The event chain module 122 moves the old event blocks from the distributed ledger 124 into a global ledger or the enterprise ledger 129 thereby saving an immense amount of disk space. The event chain module 122 will retain few recent event blocks in the transaction pool to create the event chain 656.

Each event block has the device hash or digital signature embedded in the header that can be verified. This makes sure the previous hash in each block always corresponds to the current hash in the previous block. The event chain module 122 performs another verification (also referred to as proof-of-stake process) for each event block before the event block is accepted into the event chain 656, thereby improving more security and avoiding an attacker to generate a fake event blockchain.

Figure 7:
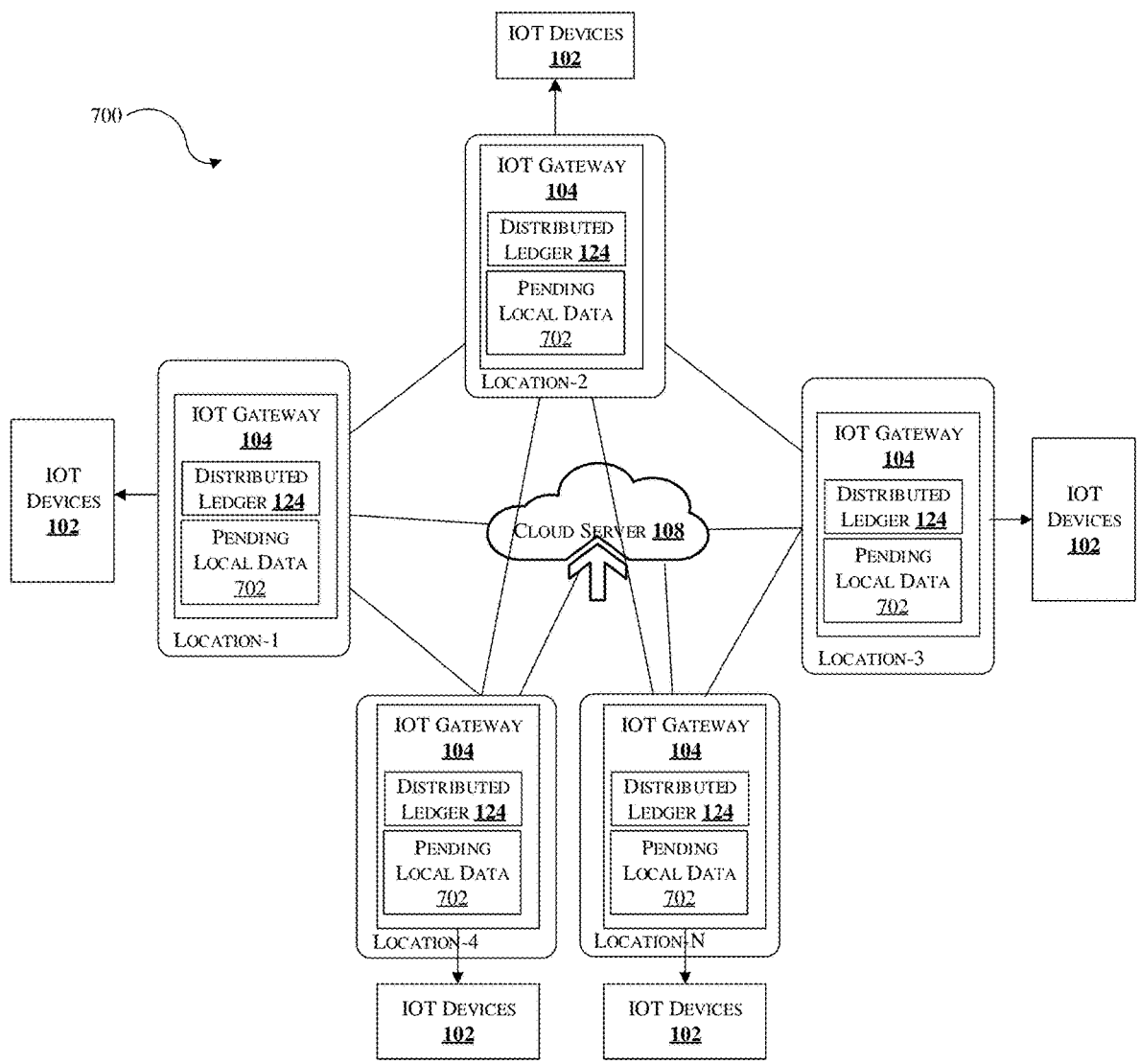
FIG. 7 is a simplified schematic diagram illustrating exemplary architecture of a cloud-based service for threat detection and anomalies identification in accordance with one embodiment of the present disclosure.

FIG. 7 illustrates an architecture of a cloud-based service for threat detection and anomalies identification using a cloud-based service or server 108. The architecture 700 comprises IOT gateway 104 of multiple locations location-1, location-2, location-3 . . . location-N communicatively coupled with each other via the cloud-based server 108. Each IOT gateway 104 interact with respective IOT devices 102 for performing transactions related to the IOT devices 102. Each IOT gateway 104 comprises the distributed ledger 124 and pending local data 702.

The cloud-based server 108 will sync with IOT gateway 104 and will add the multiple distributed ledgers (alternatively referred to as edge ledger) 124 to the global or enterprise ledger 129. The global ledger 129 stores data based on grouping and time sequencing for each commissioned device. The multi-chain blockchain schema of the IOT gateway 104 selects the node that would add the local pending data 702 to the global ledger 129. The cloud-based server 108 first validates the selected edge ledger 129, and the selected group and location adds the local pending data 702 as a new block to the global ledger 129.

The cloud-based server 108 is configured with Machine Learning and Artificial Intelligence (AI), Global Blockchain Ledger, and Context Aware Analysis for threat detection and anomalies identification. The proposed blockchain architecture is operable with private, public, and dedicated cloud services. The cloud-based server 108 is capable of building AI models to detect anomalous patterns and improve the detection of new threads, and security challenges. The cloud-based server 108 is configured with key features comprising device behavioral analytics platform, ensemble of outlier detection methods, mechanism to obtain feedback from security analysts and supervised learning module.

Figure 8:
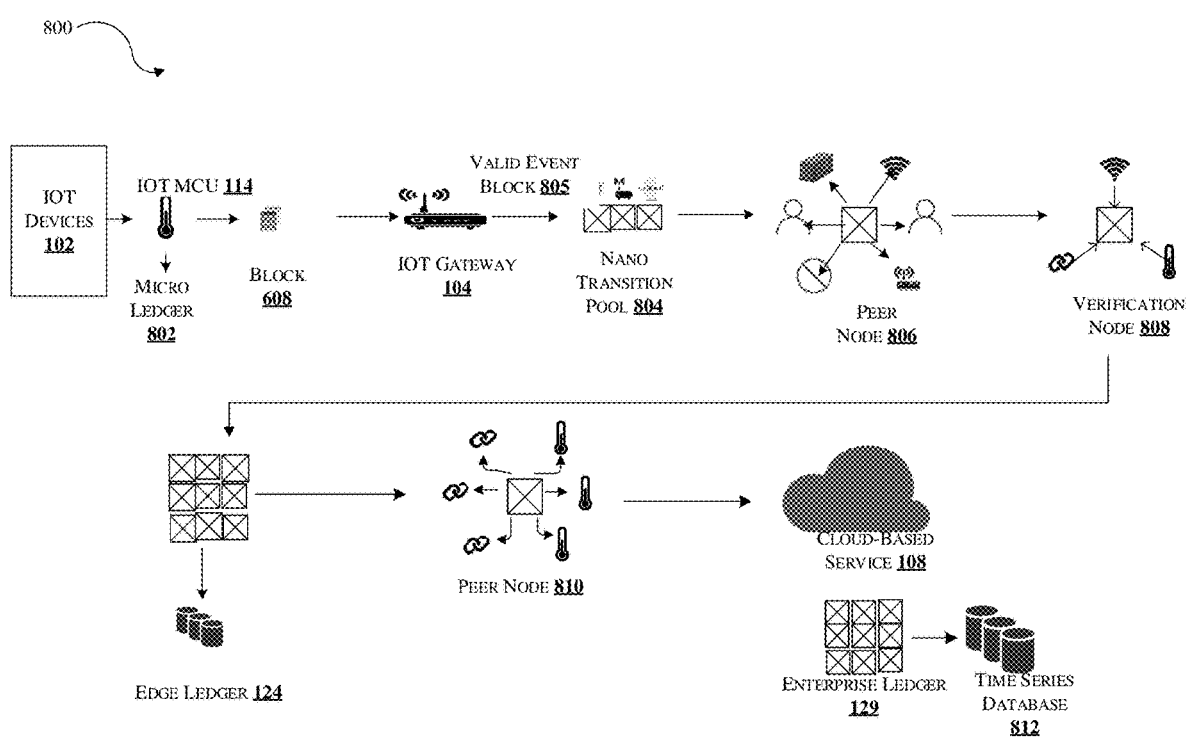
FIG. 8 is a simplified schematic flow diagram illustrating a method of enabling IOT security using distributed blockchain architecture in accordance with one embodiment of the present disclosure.

In operation, the system 100 enables permissioned multi-chain framework for providing secure access to the IOT devices 102. As illustrated in FIG. 8, in one embodiment, the IOT MCU 114 of the IOT devices 102 generate at least one encrypted block 608 using the microcode embedded within the IOT MCU 114. The encrypted block 608 may comprise a unique device ID, previous token, current token, time stamp and event data of the IOT devices 102 stored in a micro ledger 802 within the IOT MCU 114. The micro ledger 802 may also be generated by the microcode embedded within the IOT MCU 114. The microcode also defines the smart contract (alternatively referred to a device contract) 164. The smart contract 164 defines at least one pre-configured condition that may be complied with among participating nodes or entities to involve in a contractual agreement to automate the execution of payments or transaction in a transparent manner. The smart contract 164 for the IOT devices 102 may also referred as IOT contract. The IOT contract is a transaction that transfers control commands between user-to-device or device-to-device and to use the transaction based on authentication.

Before using the transaction, the user and the device must first be registered in the event chain 656, through an authentication procedure. In the case of the user, only the authorized user is authenticated using two-factor authentication technique to access the blockchain network. The user registration is initiated for every user and an account is created with user details such as a user ID, a password, a one-time password or a biometric authentication (fingerprint, iris, face recognition etc.) based on which the user verification is performed.

The IOT devices 102 can commission by the device or the administrator. The commissioning process identifies the IOT devices 102 and commission the associated device by generating a unique ID for each IOT device 102 added in the blockchain network. Several methods are being considered to determine the unique ID of the IOT devices 102. In one embodiment, the IOT devices 102 may be assigned with the unique ID generated by the microcode of the IOT MCU 114. In another embodiment, the IOT devices 102 can register the hash of unique response information, MAC address, CPU ID, disk ID, OS image, electronic wallet address, etc., to generate the unique device ID so that the IOT devices 102 can be automatically disconnected from the blockchain network and reported to the administrator whenever the IOT devices 102 is determined to be tampered.

Further, based on the smart contract 164, when the status of a program running on the IOT devices 102 changes, the smart contract 164 can manipulate the IOT devices 102, perform automatic transactions between the IOT devices 102, or transmit status information or data to a predetermined location. At this time, automatic transaction between the IOT devices 102 is called M2M transaction, and transactions can be made only to the addresses allowed to transfer in the user-device and device-device mapping advanced during commission. Device A, which receives the commands, can transmit status or control information to another device B according to the program contents and may be control device B. An automated program is added to the Smart contract allowing the user to control the device, be informed about the status of the device, automatically proceed with transactions if a certain condition is fulfilled, etc. The automated program can deliver simple formatted data according to the device's conditions, and the automated program can be provided with a programmable API type to handle more complex information. In higher performance devices, more complex and sophisticated high-level programming is added to the smart contract 164 and delivered to the IOT devices 102, and the smart contract 164 may be interpreted and processed through an interpreter or smart trigger operating within the IOT devices 102.

The IOT gateway 104 receives the at least one encrypted block 608 from the IOT devices 102 and initiates execution of smart contract associated with the IOT devices 102. The encrypted block 608 comprises a unique device identification (ID), previous token, current token, time stamp, and event data. In one embodiment, the contract event manager (CEM) 118 executes the smart contract 164 to verify the device signature and identify information that transmitted the at least one encrypted block 608. The CEM 118 parses the at least one encrypted block 608 to determine the unique device ID of the IOT devices 102. The CEM 118 verifies the device signature and identity using the device chain module 120. In one embodiment, the device chain module 120 compares the unique device ID of the encrypted block 608 with the unique ID of the IOT devices 102 stored in the device chain data 610 to verify the device signature and identity. Upon successful verification, the CEM 118 further determines the access to the event chain using the previous token, and the current token of the encrypted block 608.

In one embodiment, the CEM 118 verifies the event data received in the encrypted block 608 and allow access to the event chain. In one embodiment, the event chain module 122 verifies the received event data based on the timestamp, the previous token, and current token of the encrypted block 608. The event chain module 122 compares the device timestamp with the timestamp of the encrypted block 608 and verifies the received event data. Upon successful verification, the CEM 118 updates the event chain data 612 with the received event data in the distributed ledger 124. The CEM 118 also pushes the validated event data to a nano transition pool 804. The validated event data may be hereinafter referred to as valid event block 805. The valid event block 805 is encapsulated as envelope for distributing to the peer nodes 806 across the network. The peer nodes 806 also include verification nodes 808 to verify the envelope. Upon successful verification of the envelope, the valid event block 805 is then added to the edge ledger 124. Further, the communication service 154-2 generates automatic broadcast messages 178 comprising the valid event block 805 and broadcasts to all peer nodes 810 in the public network. The valid event block 805 may also be updated in the enterprise ledger 129 by the cloud-based service 108 and further stored in a time-series database 812 coupled with the enterprise ledger 129. Thus, the present system ensures that the event data was not compromised and accessed by unauthorized people, thereby enabling secure access to the IOT devices with improved authentication & identity, authorization, privacy, confidentiality and integrity.

Figure 9:
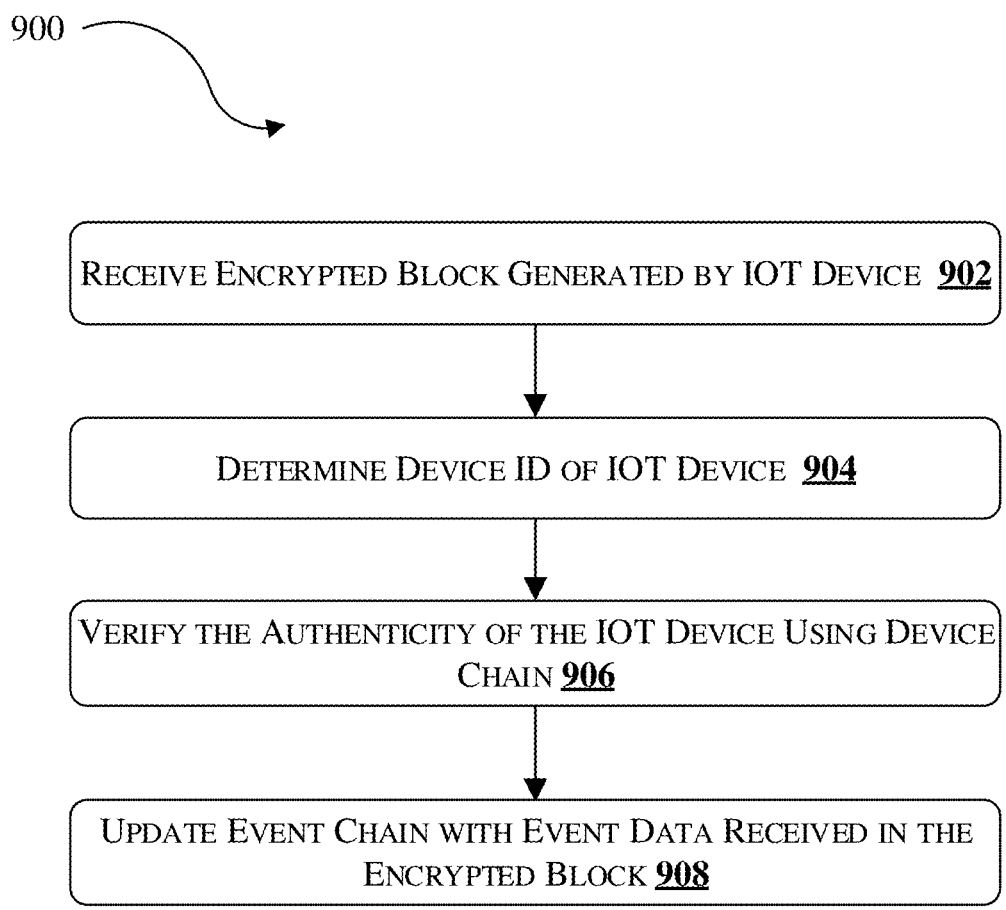
FIG. 9 is a simplified flowchart diagram illustrating a method of enabling IOT security using distributed blockchain architecture in accordance with one embodiment of the present disclosure.

FIG. 9 is a simplified flowchart diagram illustrating a method of enabling IOT security using distributed blockchain architecture. As illustrated, the method 900 comprises one or more blocks implemented by the processor 116 for enabling multi-chain verification process for IOT security. The method 900 may be described in the general context of computer executable instructions. Generally, computer executable instructions can include routines, programs, objects, components, data structures, procedures, modules, and functions, which perform particular functions or implement particular abstract data types.

The order in which the method 900 is described is not intended to be construed as a limitation, and any number of the described method blocks can be combined in any order to implement the method 900. Additionally, individual blocks may be deleted from the method 900 without departing from the scope of the subject matter described herein. Furthermore, the method 900 can be implemented in any suitable hardware, software, firmware, or combination thereof.

At block 902, encrypted block 608 generated by the IOT devices 102 is received by the IOT gateway 104. In one embodiment, the IOT gateway 104 receives the at least one encrypted block 608 from the IOT devices 102 and initiates execution of smart contract 164 associated with the IOT devices 102. The encrypted block 608 may comprise a unique device ID, previous token, current token, time stamp and event data of the IOT devices 102 stored in a micro ledger 802 within the IOT MCU 114.

At block 904, unique device ID of the IOT device 102 is determined by the CEM 118. In one embodiment, the contract event manager (CEM) 118 executes the smart contract 164 to verify the device signature and identify information that transmitted the at least one encrypted block 608. The CEM 118 parses the at least one encrypted block 608 to determine the unique device ID of the IOT devices 102.

At block 906, the authenticity of the IOT devices 102 is verified by the CEM 118 using the device chain 654. The CEM 118 verifies the device signature and identity using the device chain module 120. In one embodiment, the device chain module 120 compares the unique device ID of the encrypted block 608 with the unique ID of the IOT devices 102 stored in the device chain data 610 to verify the device signature and identity. Upon successful verification, the CEM 118 further determines the access to the event chain using the previous token, and the current token of the encrypted block 608.

At block 908, event chain is updated with the received event data upon successful verification. In one embodiment, the CEM 118 verifies the event data received in the encrypted block 608 and allow access to the event chain. In one embodiment, the event chain module 122 verifies the received event data based on the timestamp, the previous token, and current token of the encrypted block 608. The event chain module 122 compares the device timestamp with the timestamp of the encrypted block 608 and verifies the received event data. Upon successful verification, the CEM 118 updates the event chain data 612 with the received event data in the distributed ledger 124. The CEM 118 also pushes the validated event data to a nano transition pool 804. The validated event data may be hereinafter referred to as valid event block 805. The valid event block 805 is encapsulated as envelope for distributing to the peer nodes 806 across the network. The peer nodes 806 also include verification nodes 808 to verify the envelope. Upon successful verification of the envelope, the valid event block 805 is then added to the edge ledger 124. Further, the communication service 154-2 generates automatic broadcast messages 178 comprising the valid event block 805 and broadcasts to all peer nodes 810 in the public network. The valid event block 805 may also be updated in the enterprise ledger 129 by the cloud-based service 108 and further stored in a time-series database 812 coupled with the enterprise ledger 129. Thus, the present system ensures that the event data was not compromised and accessed by unauthorized people, thereby enabling secure access to the IOT devices with improved authentication & identity, authorization, privacy, confidentiality and integrity.

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

Figure 10:
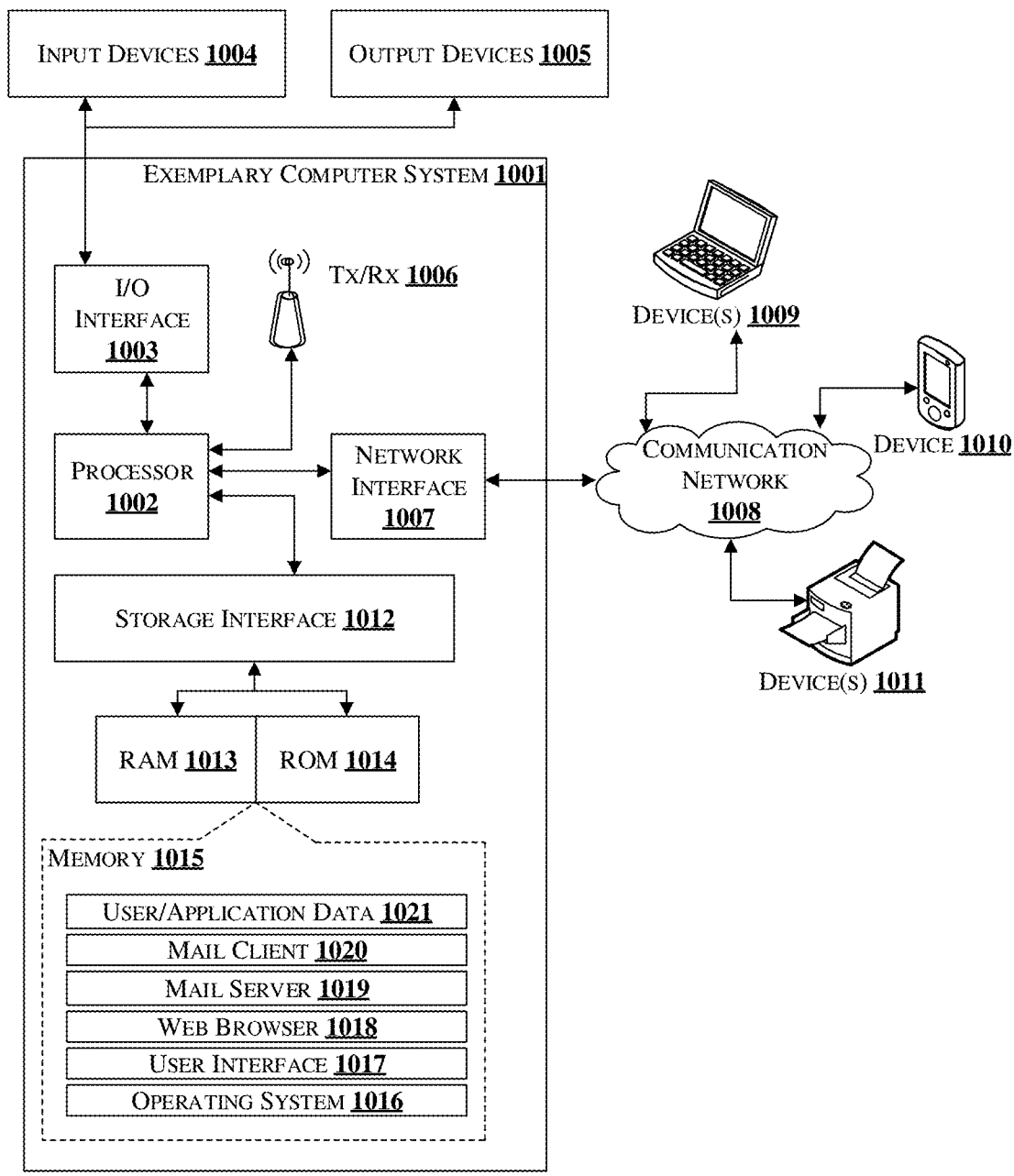
FIG. 10 is a simplified block diagram of an exemplary computer system for implementing embodiments consistent with the present disclosure.

FIG. 10 is a block diagram of an exemplary computer system for implementing embodiments consistent with the present disclosure.

Variations of computer system 1001 may be used for implementing all the computing systems that may be utilized to implement the features of the present disclosure. Computer system 1001 may comprise a central processing unit ("CPU" or "processor") 1002. The processor 1002 may comprise at least one data processor for executing program components for executing user- or system-generated requests. The processor 1002 may include specialized processing units such as integrated system (bus) controllers, memory management control units, floating point units, graphics processing units, digital signal processing units, etc. The processor 1002 may include a microprocessor, such as AMD Athlon, Duron or Opteron, ARM's application, embedded or secure processors, IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver 1006 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface 1007 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1009, 1010, and 1011. These devices 1009, 1010 and 1011 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface 1012 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 1015 may store a collection of program or database components, including, without limitation, an operating system 1016, a user interface application 1017, a web browser 1018, a mail server 1019, a mail client 1020, user/application data 1021 (e.g., any data variables or data records discussed in this disclosure), etc. The operating system 1016 may facilitate resource management and operation of the computer system 1001. Examples of the operating system 1016 include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface application 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1001 may implement a web browser 1018 stored program component. The web browser 1018 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. The web browser 1018 may utilize facilities such as AJAX, DHTML, Adobe Flash, JavaScript, Java, application programming interfaces (APIs), etc. In some embodiments, the computer system 1001 may implement a mail server 1019 stored program component. The mail server 1019 may be an Internet mail server such as Microsoft Exchange, or the like. The mail server 1019 may utilize facilities such as ASP, ActiveX, ANSI C++/C#, Microsoft .NET, CGI scripts, Java, JavaScript, PERL, PHP, Python, WebObjects, etc. The mail server 1019 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client 1020 may be a mail viewing application, such as Apple Mail, Microsoft Entourage, Microsoft Outlook, Mozilla Thunderbird, etc.

In some embodiments, computer system 1001 may store user/application data 1021, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A method of enabling secure access to at least one Internet of Things (JOT) device on a network by an JOT security system, comprising:

receiving, by a processor of an JOT gateway device of the JOT security system, at least one encrypted block generated by at least one JOT device on the network, wherein the at least one encrypted block comprises a unique device identification (ID), a previous device token, a current device token, a time stamp, and an event data;

parsing, by the processor, the at least one encrypted block received to determine the unique device ID of the at least one JOT device;

verifying, by the processor, the authenticity of the at least one JOT device using a device chain to validate a device signature and identity of the at least one JOT device;

determining, by the processor, access to an event chain using a previous event token and a current event token of the at least one encrypted block, upon successful verification of the at least one JOT device;

validating, by the processor, the received event data by time synchronizing the device chain and the event chain;

updating, by the processor, the event chain with the received event data upon verifying the received event data using the time stamp, the previous device token and the current device token of the at least one encrypted block.

2. The method as claimed in claim 1, wherein the device chain comprises one device block for each JOT device, each device block comprises unique device ID and a link to a previous device ID, a previous device token, a current device token, an event chain address, a payload, a gateway group ID, a smart contract information, and other optional parameters associated with each JOT device.

3. The method as claimed in claim 2, wherein the event chain comprises at least one event block for each device block of the device chain, wherein each event block comprises device signature associated with the at least one JOT device, and the event data generated by at least one IOT device at a given time.

4. The method as claimed in claim 1, wherein the device chain and the event chain are stored in a distributed ledger database of the IOT gateway device.

5. The method as claimed in claim 1, further comprising:
broadcasting the updated event data to one or more peer gateway nodes; and
transmitting the updated event data stored in the event chain to a cloud-based storage system after a predetermined time.

6. The method as claimed in claim 1, wherein the time synchronizing is performed using one or more smart contracts.

7. The method as claimed in claim 1, wherein the distributed ledger stores a list of device ID/device signature and event address.

8. An IOT security system for enabling secure access to at least one Internet of Things (JOT) device on a private network, comprising:
at least one IOT gateway device for communicating with at least one IOT device, wherein the at least one IOT gateway device comprises:
a processor;
a distributed ledger database communicatively coupled with the processor; and
a memory coupled to the processor, wherein the memory stores processor instructions, which, on execution, causes the processor to:

receive at least one encrypted block generated by at least one IOT device on the private network, wherein the at least one encrypted block comprises a unique device identification (ID), previous token, current token, time stamp, and event data;

parse the at least one encrypted block received to determine the unique device ID of the at least one IOT device;

verify the authenticity of the at least one IOT device using a device chain to validate a device signature and identity of the at least one IOT device;

determine access to an event chain using the previous token and the current token of the at least one encrypted block, upon successful verification of the at least one IOT device;

verify, by the processor, the received event data by time synchronizing the device chain and the event chain; and update the event chain with the received event data upon verifying the received event data using time stamp, the previous token and the current token of the at least one encrypted block.

9. The system as claimed in claim 8, wherein the device chain comprises one device block for each IOT device, each device block comprises unique device ID and link to previous device ID, previous token, current token, event chain address, payload, gateway group ID, smart contract information, and other optional parameters associated with each IOT device.

10. The system as claimed in claim 9, wherein the event chain comprises at least one event block for each device block of the device chain, wherein each event block comprises device signature associated with the at least one IOT device, and the event data generated by at least one IOT device at a given time.

11. The system as claimed in claim 8, wherein the device chain and the event chain are stored in a distributed ledger of the IOT gateway device.

12. The system as claimed in claim 8, wherein the processor instructions further cause the processor to:
broadcast the updated event data to one or more peer gateway nodes; and
transmit the updated event data stored in the event chain to a cloud-based storage system after a predetermined time.

13. The system as claimed in claim 8, wherein the time synchronizing is performed using one or more smart contracts.

14. The system as claimed in claim 8, wherein the distributed ledger stores a list of device ID/device signature and the event address.

15. A non-transitory computer readable medium including instructions stored thereon that when processed by at least one processor cause a processor of an IOT gateway device to perform acts of:

receive at least one encrypted block generated by at least one IOT device on a private network, wherein the at least one encrypted block comprises a unique device identification (ID), previous token, current token, time stamp, and event data;

parse the at least one encrypted block received to determine the unique device ID of the at least one IOT device;

verify the authenticity of the at least one IOT device using a device chain to validate a device signature and identity of the at least one IOT device;

determine access to an event chain using the previous token and the current token of the at least one encrypted block, upon successful verification of the at least one IOT device;

verify, by the processor, the received event data by time synchronizing the device chain and the event chain; and update the event chain with the received event data upon verifying the received event data using time stamp, the previous token and the current token of the at least one encrypted block.

16. The medium as claimed in claim 15, wherein the device chain comprises one device block for each IOT device, each device block comprises unique device ID and link to previous device ID, previous token, current token, event chain address, payload, gateway group ID, smart contract information, and other optional parameters associated with each IOT device.

17. The medium as claimed in claim 16, wherein the event chain comprises at least one event block for each device block of the device chain, wherein each event block comprises device signature associated with the at least one IOT device, and the event data generated by at least one IOT device at a given time.

18. The medium as claimed in claim 15, wherein the device chain and the event chain are stored in a distributed ledger of the IOT gateway device.

19. The medium as claimed in claim 15 wherein the processor instructions further cause the processor to:
broadcast the updated event data to one or more peer gateway nodes; and
transmit the updated event data stored in the event chain to a cloud-based storage system after a predetermined time.

20. The medium as claimed in claim 15, wherein the time synchronizing is performed using one or more smart contracts, wherein the distributed ledger stores a list of device ID/device signature and the event address.

* * * * *